US010900405B2

(12) United States Patent
Hakeem et al.

(10) Patent No.: US 10,900,405 B2
(45) Date of Patent: Jan. 26, 2021

(54) METHODS AND SYSTEMS FOR ESTIMATING A FLOW OF GASES IN A SCAVENGE EXHAUST GAS RECIRCULATION SYSTEM OF A SPLIT EXHAUST ENGINE SYSTEM

(71) Applicant: Ford Global Technologies, LLC, Dearborn, MI (US)

(72) Inventors: Mohannad Hakeem, Dearborn, MI (US); Timothy Clark, Livonia, MI (US); Daniel Madison, Dearborn, MI (US); Gopichandra Sumilla, West Bloomfield, MI (US); Ashley Wiese, Ann Arbor, MI (US); Joseph Norman Ulrey, St. Joseph, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/435,374

(22) Filed: Jun. 7, 2019

(65) Prior Publication Data
US 2020/0386141 A1    Dec. 10, 2020

(51) Int. Cl.
*F01N 13/00* (2010.01)
*F01N 13/10* (2010.01)
(Continued)

(52) U.S. Cl.
CPC .............. *F01N 13/009* (2014.06); *F01N 3/10* (2013.01); *F01N 13/107* (2013.01);
(Continued)

(58) Field of Classification Search
CPC ........ F02M 26/05; F02M 26/06; F02M 26/07; F02M 26/15; F02M 26/41; F02M 26/43;
(Continued)

(56) References Cited

U.S. PATENT DOCUMENTS 6,742,506 B1    6/2004  Grandin
6,827,051 B2    12/2004 Kawasaki et al.
(Continued)

FOREIGN PATENT DOCUMENTS

WO      2016128642 A1    8/2016

OTHER PUBLICATIONS

Surnilla, G. et al., "Method for Determining a Dilution of Recirculated Gases in a Split Exhaust Engine," U.S. Appl. No. 15/926,940, filed Mar. 20, 2018, 72 pages.
(Continued)

*Primary Examiner* — Jesse S Bogue
*Assistant Examiner* — Loren C Edwards
(74) *Attorney, Agent, or Firm* — Geoffrey Brumbaugh; McCoy Russell LLP

(57) ABSTRACT

Methods and systems are provided for adjusting operation of a split exhaust engine system based on a total flow of gases through a scavenge exhaust gas recirculation system of the split exhaust engine system. In one example, a method may include adjusting engine operation in response to a flow of gases to an intake passage, upstream of a compressor, from a scavenge manifold coupled to scavenge exhaust valves, the flow of gases determined based on a valve opening overlap between the scavenge exhaust valves and intake valves of an engine, the scavenge exhaust valves opened at a different time than blowdown exhaust valves coupled to a blowdown manifold coupled to a turbine.

20 Claims, 8 Drawing Sheets

(51) Int. Cl.
*F02B 25/14* (2006.01)
*F02B 37/02* (2006.01)
*F02B 37/18* (2006.01)
*F02D 13/02* (2006.01)
*F02D 41/00* (2006.01)
*F02M 26/05* (2016.01)
*F02M 26/07* (2016.01)
*F02M 26/15* (2016.01)
*F02M 26/41* (2016.01)
*F02M 26/43* (2016.01)
*F02M 26/44* (2016.01)
*F01N 3/10* (2006.01)

(52) U.S. Cl.
CPC .......... *F02B 25/145* (2013.01); *F02B 37/025* (2013.01); *F02B 37/183* (2013.01); *F02D 13/0257* (2013.01); *F02D 13/0261* (2013.01); *F02D 41/0007* (2013.01); *F02D 41/0055* (2013.01); *F02D 41/0065* (2013.01); *F02M 26/05* (2016.02); *F02M 26/07* (2016.02); *F02M 26/15* (2016.02); *F02M 26/41* (2016.02); *F02M 26/43* (2016.02); *F02M 26/44* (2016.02); *F01N 2410/00* (2013.01)

(58) Field of Classification Search
CPC . F02M 26/44; F02D 13/0257; F02D 13/0261; F02D 13/0249; F02D 13/0276; F02D 41/0007; F02D 41/0077; F02D 41/005; F02D 41/0065
See application file for complete search history.

(56) References Cited

U.S. PATENT DOCUMENTS

| | | | |
|---|---|---|---|
| 6,840,235 B2 | 1/2005 | Koseki et al. | |
| 8,069,663 B2 | 12/2011 | Ulrey et al. | |
| 8,479,511 B2 | 7/2013 | Pursifull et al. | |
| 8,495,992 B2 | 7/2013 | Roth | |
| 8,511,084 B2 | 8/2013 | Ulrey et al. | |
| 8,539,770 B2 | 9/2013 | Williams | |
| 8,601,811 B2 | 12/2013 | Pursifull et al. | |
| 8,701,409 B2 | 4/2014 | Pursifull et al. | |
| 9,080,523 B1 | 7/2015 | Ulrey et al. | |
| 10,012,159 B1 | 7/2018 | Ulrey et al. | |
| 10,018,123 B1 | 7/2018 | Ulrey et al. | |
| 10,024,255 B2 | 7/2018 | Ulrey et al. | |
| 10,060,371 B2 | 8/2018 | Ulrey | |
| 10,094,310 B2 | 10/2018 | Ulrey et al. | |
| 10,107,220 B2 | 10/2018 | Ulrey et al. | |
| 10,132,235 B2 | 11/2018 | Ulrey et al. | |
| 10,138,822 B2 | 11/2018 | Ulrey et al. | |
| 10,145,315 B2 | 12/2018 | Ulrey et al. | |
| 10,161,332 B2 | 12/2018 | Ulrey et al. | |
| 10,190,507 B2 | 1/2019 | Ulrey et al. | |
| 10,316,771 B2 | 6/2019 | Ulrey et al. | |
| 10,328,924 B2 | 6/2019 | Ulrey et al. | |
| 10,330,001 B2 | 6/2019 | Leone et al. | |
| 10,337,425 B2 | 7/2019 | Boyer et al. | |
| 2015/0198099 A1* | 7/2015 | Ulrey | F02D 13/0242 60/602 |
| 2015/0316005 A1 | 11/2015 | Madison et al. | |
| 2018/0171845 A1 | 6/2018 | Veiga Pagliari et al. | |
| 2018/0171898 A1* | 6/2018 | Ulrey | F01N 13/107 |
| 2018/0171899 A1 | 6/2018 | Ulrey et al. | |
| 2018/0171907 A1 | 6/2018 | Ulrey et al. | |
| 2018/0171913 A1 | 6/2018 | Ulrey et al. | |
| 2019/0040791 A1* | 2/2019 | Ulrey | F02M 26/15 |

OTHER PUBLICATIONS

Madison, D. et al., "Method for Determining a Dilution of Recirculated Gases in a Split Exhaust Engine," U.S. Appl. No. 15/926,940, filed Mar. 20, 2018, 75 pages.

Hakeem, M. et al., "Methods and Systems for Estimating a Composition of Flow Through a Scavenge Exhaust Gas Recirculation System of a Split Exhaust Engine System," U.S. Appl. No. 16/435,395, filed Jun. 7, 2019, 68 pages.

\* cited by examiner

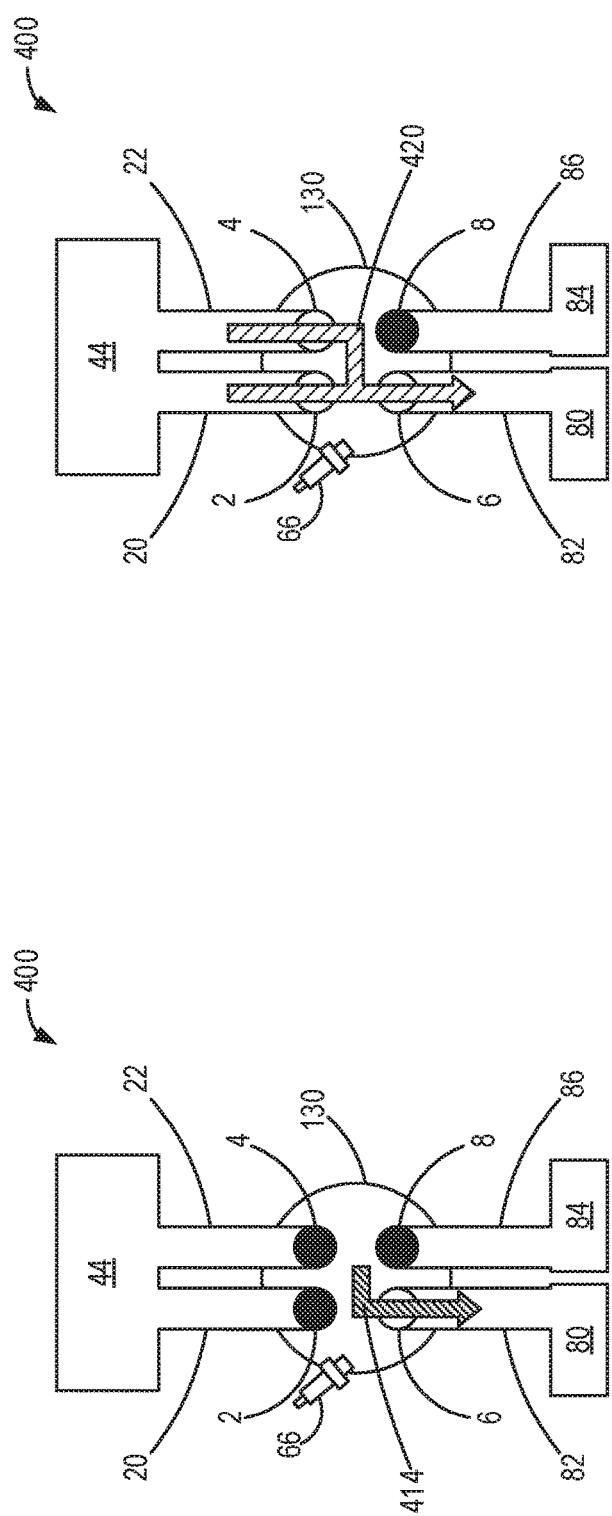
FIG. 4A
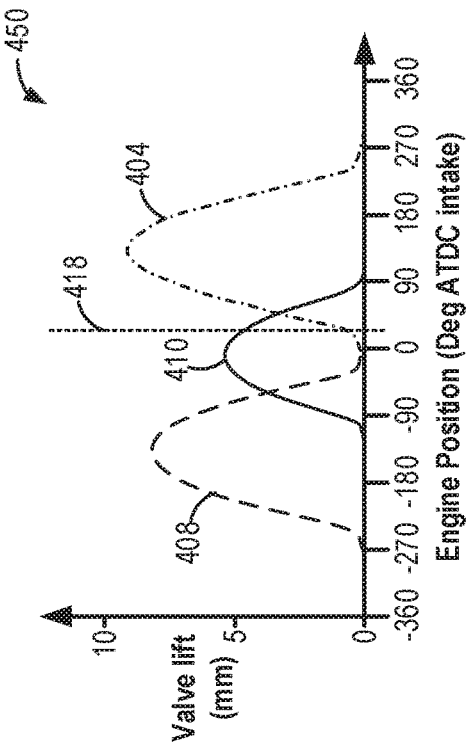
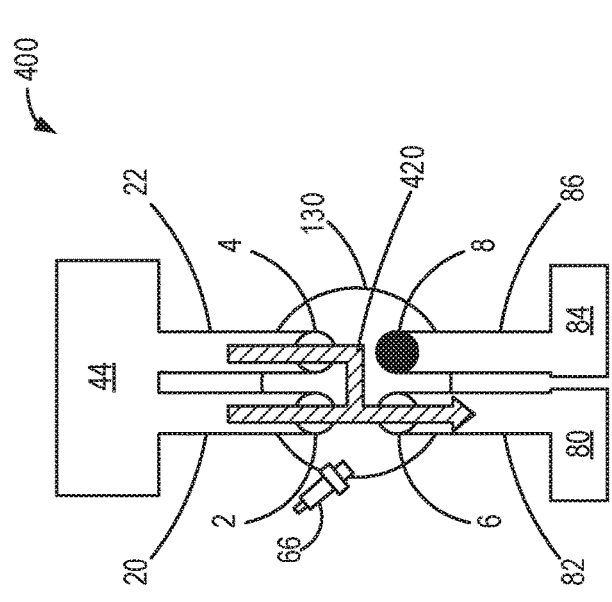
FIG. 4B
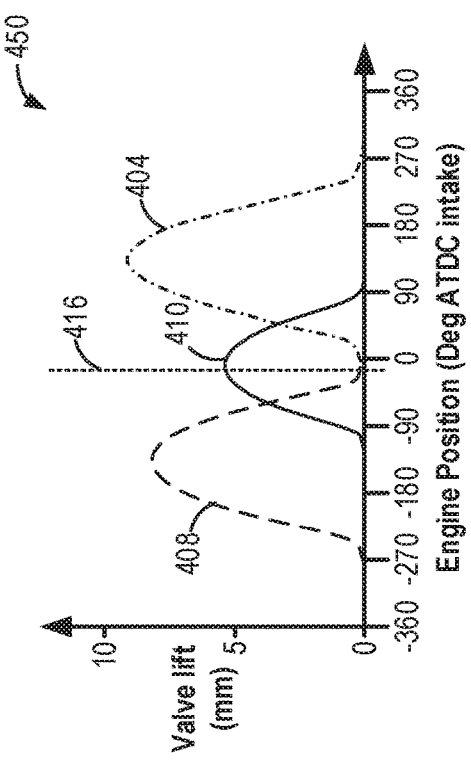

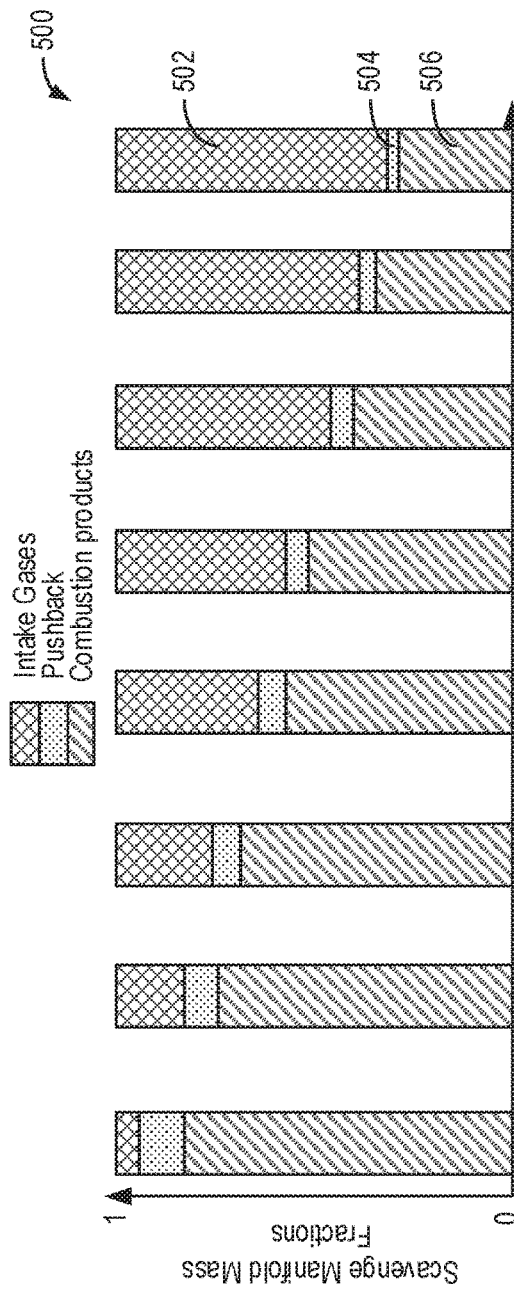
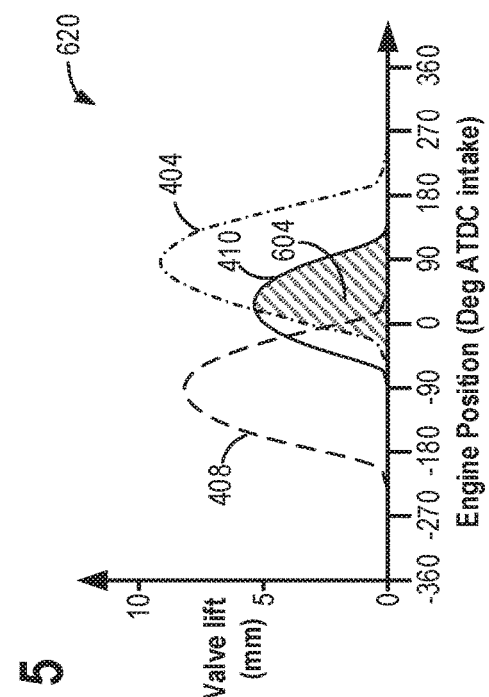
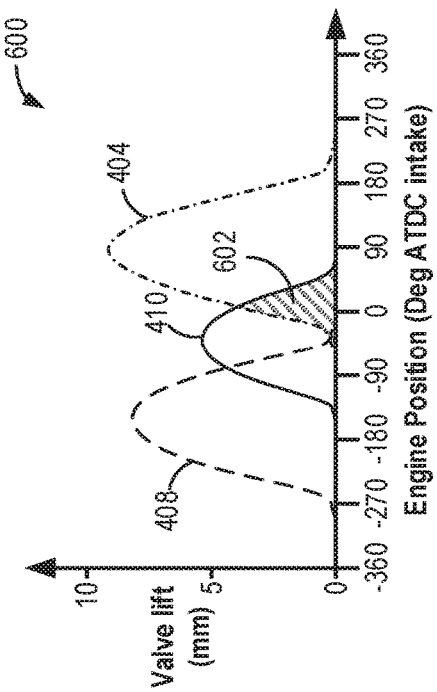
FIG. 5
FIG. 6A
FIG. 6B

METHODS AND SYSTEMS FOR ESTIMATING A FLOW OF GASES IN A SCAVENGE EXHAUST GAS RECIRCULATION SYSTEM OF A SPLIT EXHAUST ENGINE SYSTEM

FIELD

The present description relates generally to methods and systems for an engine having a split exhaust system.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that a split exhaust system, where a first exhaust manifold routes exhaust to a turbine of the turbocharger in an exhaust of the engine and a second exhaust manifold routes exhaust gas recirculation (EGR) to an intake of the engine, upstream of a compressor of the turbocharger, may decrease engine knock and increase engine efficiency. In such an engine system, each cylinder may include two intake valves and two exhaust valves, where a first set of cylinder exhaust valves (e.g., blowdown exhaust valves) are exclusively coupled to the first exhaust manifold via a first set of exhaust ports, and a second set of cylinder exhaust valves (e.g., scavenge exhaust valves) are exclusively coupled to the second exhaust manifold via a second set of exhaust ports. The first set of cylinder exhaust valves may be operated at a different timing than the second set of cylinder exhaust valves, thereby isolating a blowdown portion and a scavenging portion of exhaust gases. The timing of the second set of cylinder exhaust valves may also be coordinated with a timing of the cylinder intake valves to create a positive valve overlap period where fresh intake air (or a mixture of fresh intake air and EGR), referred to as blowthrough, may flow through the cylinders and back to the intake, upstream of the compressor, via an EGR passage coupled to the second exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while increasing a work efficiency of the turbine and increasing engine torque.

However, the inventors herein have recognized potential issues with such systems. As one example, in the engine system described above, a flow measurement and/or composition of the recirculated gases flowing through the EGR passage may be difficult to obtain. However, these measurements may be necessary for accurate scavenge exhaust system control. For example, previous methods of measuring flow through the EGR valve in the EGR passage utilize a delta pressure measurement system and an orifice flow equation. However, this measurement requires a significant restriction resulting in a high delta pressure across the orifice, such as obtained by using a rocket nozzle or venturi design, in order to ensure a high signal to noise ratio. This significant pressure drop needed for flow measurement may limit engine performance at high load conditions due to limiting flow through the EGR and/or intake system.

In one example, the issues described above may be addressed by a method comprising: adjusting engine operation in response to a flow of gases to an intake passage, upstream of a compressor, from a scavenge manifold coupled to scavenge exhaust valves, the flow of gases determined based on a valve opening overlap between the scavenge exhaust valves and intake valves of an engine, the scavenge exhaust valves opened at a different time than blowdown exhaust valves coupled to a blowdown manifold coupled to a turbine. In one example, the flow of gases may be a total flow gases through a scavenge EGR system, from the scavenge manifold to the intake passage. Additionally, the valve opening overlap may be a valve opening overlap area, determined based on valve lifts of each of the scavenge exhaust valves and the intake valves. In some examples, the total flow of gases may be further determined based on an intake manifold pressure and scavenge manifold pressure. By adjusting engine operation in response to the determined total flow of gases based on the above-described valve overlap area and pressure measurements, engine efficiency may be increased without limiting engine performance at high loads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4D schematically illustrate sources of different recirculated gases throughout an open duration of the scavenge exhaust valve with respect to example engine positions.

FIG. 5 shows an example map of a relationship between scavenge manifold mass fractions of scavenge manifold gas portions and an amount of scavenge valve and intake valve overlap.

FIGS. 6A-6B show example valve timing diagrams for different amounts of scavenge valve and intake valve overlap.

DETAILED DESCRIPTION

Figure 1:
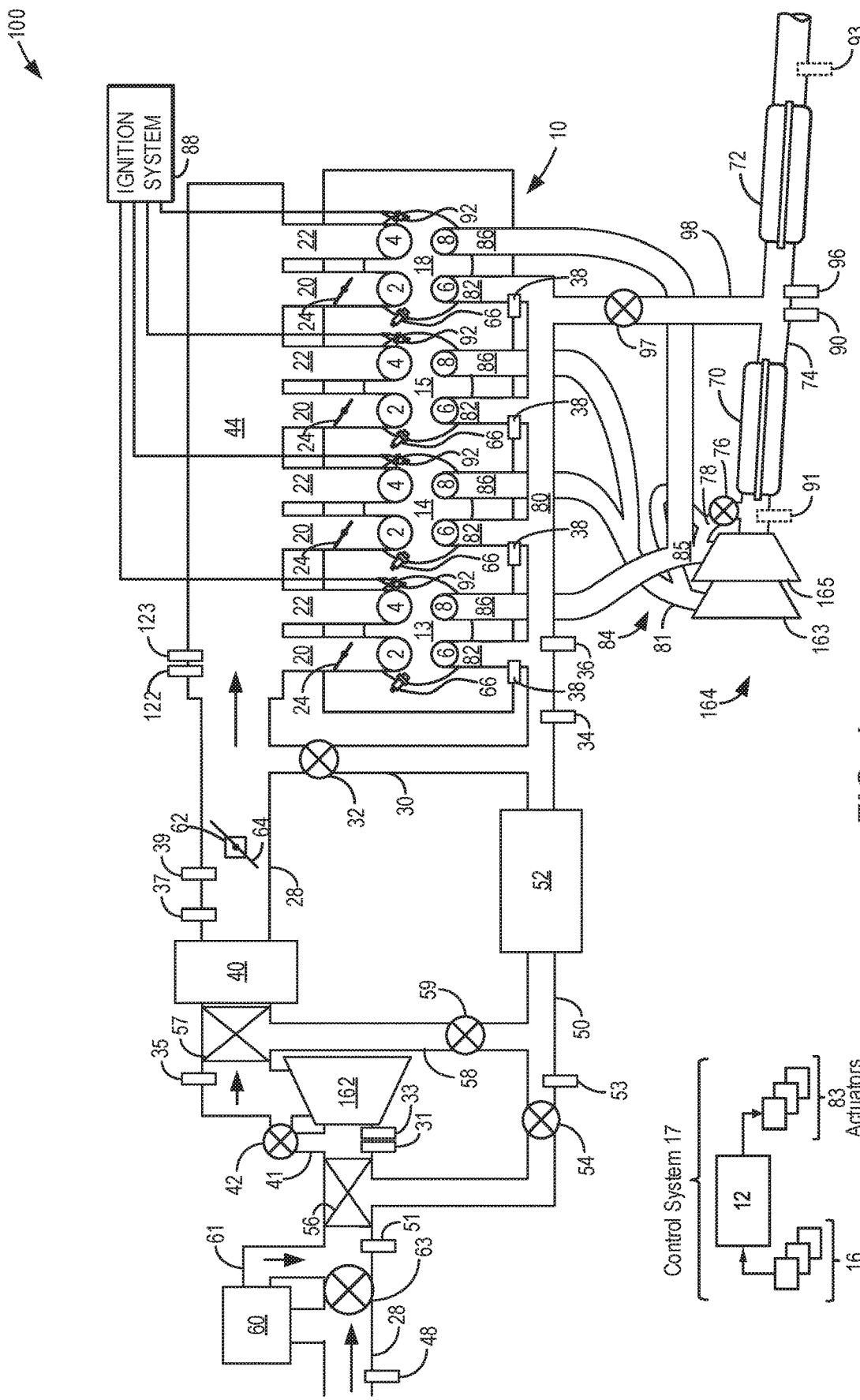
FIG. 1 shows a schematic depiction of a turbocharged engine system with a split exhaust system.
Figure 7:
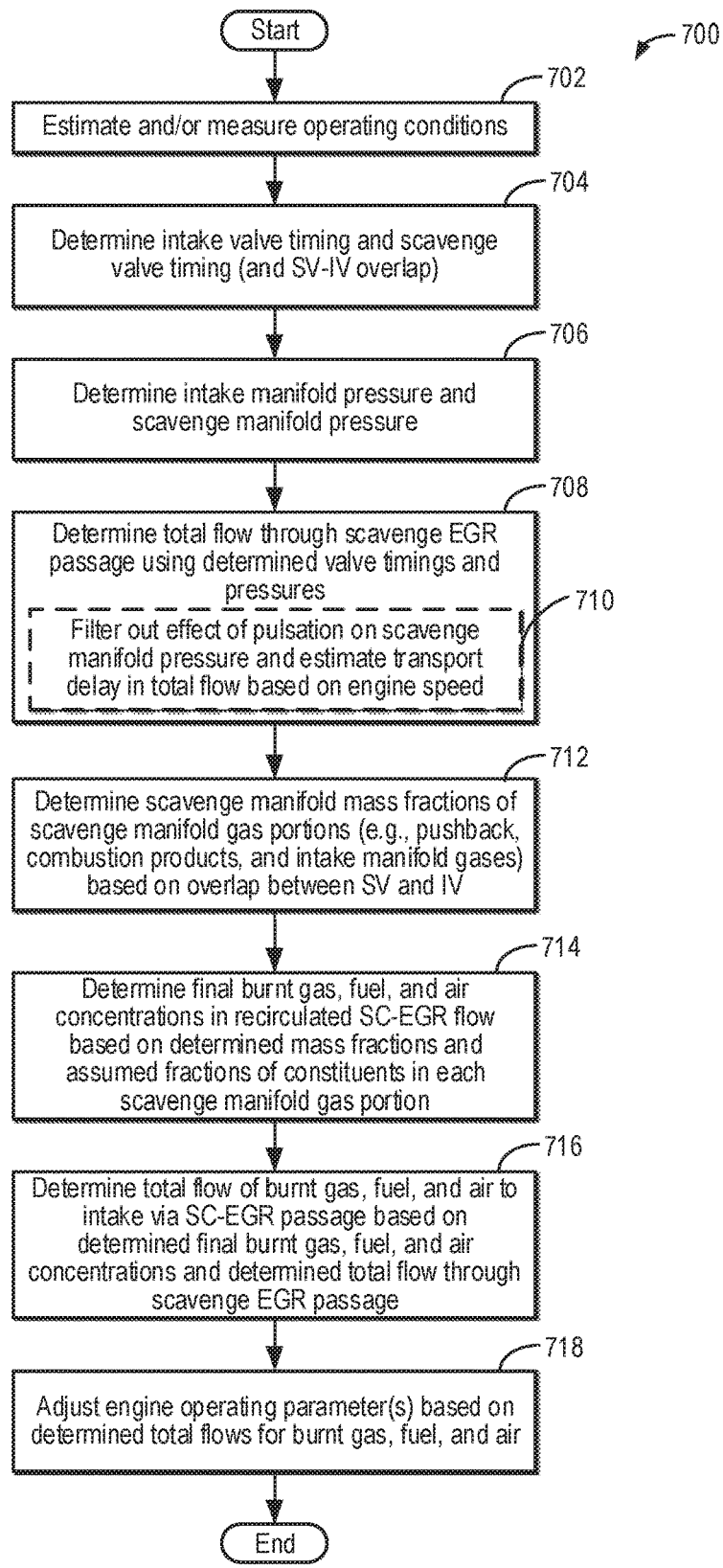
FIG. 7 shows a flow chart of an example method for determining total flow through a scavenge exhaust gas recirculation passage and relative concentrations of burnt gases, fuel, and air within the total flow.

The following description relates to systems and methods for operating a split exhaust engine with blowthrough and exhaust gas recirculation (EGR) to an intake via a scavenge manifold and adjusting engine operation based on a flow amount and concentration of gases recirculated to an intake passage via a scavenge EGR system. An example of a split exhaust engine including a scavenge EGR system is shown in FIG. 1. In one embodiment, the engine may be installed in a hybrid vehicle system, such as the vehicle system of FIG. 2. As shown in the cylinder valve timing diagram of FIG. 3, a valve overlap period occurs between the scavenge exhaust valve (e.g., second exhaust valve) and the intake valves, where these valves are open at the same time. During this valve overlap period, which may vary in length based on valve timings, different gas portions from different sources may enter the scavenge exhaust manifold (and thus be recirculated to the intake passage), as shown by FIGS. 4A-4D. Each of these different gas portions may contain different concentrations of burnt gases, fresh air, and unburned hydrocarbons. The relative mass fractions of the different recirculated gas portions (including intake gases, pushback gases, and combustion products) may vary based on the amount of valve overlap between the intake valves and scavenge valves, as illustrated by the map shown in FIG. 5. Example valve timing diagrams for the extreme overlap amounts of FIG. 5 are shown in FIGS. 6A-6B. The total bulk flow recirculated to the intake passage from the scavenge manifold, via the scavenge EGR passage, may be determined based on a valve overlap area between the scavenge valve and intake valves and pressures in the intake manifold and scavenge manifold, as shown by the method of FIG. 7. The method of FIG. 7 further includes using a relationship, such as the map presented in FIG. 5, along with the determined total flow to determine individual total flows for each of burnt gases, unburned hydrocarbons, and fresh air recirculated via the scavenge EGR passage. In this way, the concentrations of the individual constituents (e.g., burnt gas, air, and fuel) within the total bulk scavenge EGR flow may be learned and used to adjust engine operation. As a result, engine efficiency may be increased.

Turning now to the figures, FIG. 1 shows a schematic diagram of an engine system including a multi-cylinder internal combustion engine 10, which may be included in a propulsion system of a vehicle 100. Engine 10 includes a plurality of combustion chambers (e.g., cylinders), which may be capped on the top by a cylinder head. In the example shown in FIG. 1, engine 10 includes cylinders 13, 14, 15, and 18, arranged in an inline-4 configuration. Cylinders 14 and 15 are referred to herein as the inner (or inside) cylinders, and cylinders 13 and 18 are referred to herein as the outer (or outside) cylinders. However, it should be understood that although FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as will be further described below.

Each of cylinders 13, 14, 15, and 18 include two intake valves, including a first intake valve 2 and a second intake valve 4, and two exhaust valves, including a first exhaust valve (referred to herein as a blowdown exhaust valve, or blowdown valve) 8 and a second exhaust valve (referred to herein as a scavenge exhaust valve, or scavenge valve) 6. The intake valves and exhaust valves may be referred to herein as cylinder intake valves and cylinder exhaust valves, respectively. As explained below with reference to FIG. 2, a timing (e.g., opening timing, closing timing, opening duration, etc.) of each of the intake valves may be controlled via various camshaft timing systems. In one example, both of the first intake valves 2 and the second intake valves 4 may be controlled to a same valve timing, such that they open and close at the same time in the engine cycle. In an alternative example, the first intake valves 2 and the second intake valves 4 may be controlled at a different valve timing. Further, the first exhaust valves 8 may be controlled at a different valve timing than the second exhaust valves 6, such that the first exhaust valve and the second exhaust valve of a same cylinder open and close at different times than one another and the intake valves, as further discussed below.

Each cylinder receives intake air (or a mixture of intake air and recirculated exhaust gas, as will be elaborated below) from an intake manifold 44 via an air intake passage 28. Intake manifold 44 is coupled to the cylinders via intake ports (e.g., runners). For example, intake manifold 44 is shown coupled to each first intake valve 2 of each cylinder via a first intake port 20. Further, intake manifold 44 is coupled to each second intake valve 4 of each cylinder via a second intake port 22. In this way, each cylinder intake port can selectively communicate with the cylinder it is coupled to via a corresponding one of the first intake valves 2 or second intake valves 4. Each intake port may supply air, recirculated exhaust gas, and/or fuel to the cylinder it is coupled to for combustion.

One or more of the intake ports may include a charge motion control device, such as a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other configurations of the valve are possible. Note that for the purposes of this disclosure, the CMCV 24 is in the "closed" (e.g., fully closed) position when it is fully activated and the valve plate is fully tilted into the respective first intake port 20, thereby resulting in maximum air charge flow obstruction. Alternatively, the CMCV 24 is in the "open" (e.g., fully open) position when deactivated and the valve plate is fully rotated to lie substantially parallel with airflow, thereby considerably minimizing or eliminating airflow charge obstruction. The CMCVs may be principally maintained in their "open" position and may only be activated "closed" when swirl conditions are desired. As shown in FIG. 1, only one intake port of each cylinder includes CMCV 24. However, in other examples, both intake ports of each cylinder may include a CMCV 24. A controller 12 may actuate CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active. As referred to herein, blowthrough air or blowthrough combustion cooling (BTCC) may refer to intake air that flows from the one or more intake valves of each cylinder to second exhaust valves 6 during a valve opening overlap period between the intake valves and second exhaust valves 6 (e.g., a period when both the intake valves and second exhaust valves 6 are open at the same time), without combusting the blowthrough air.

A high pressure, dual stage fuel system (such as the fuel system shown in FIG. 2) may be used to generate fuel pressures at a fuel injector 66 coupled to each cylinder. As such, fuel may be directly injected into the cylinders via fuel injectors 66. A distributorless ignition system 88 provides an ignition spark to cylinders 13, 14, 15, and 18 via spark plugs 92 in response to a signal from controller 12 to initiate combustion.

Cylinders 13, 14, 15, and 18 are each coupled to two exhaust ports for channeling blowdown and scavenging portions of the combustion gases separately via a split exhaust system. Specifically, as shown in FIG. 1, cylinders 14 and 15 exhaust a first, blowdown portion of the combustion gases to a first manifold portion 81 of a first exhaust manifold (also referred to herein as a blowdown manifold) 84 via first exhaust ports (e.g., runners) 86 and a second, scavenging portion of the combustion gases to a second exhaust manifold (also referred to herein as a scavenge manifold) 80 via second exhaust ports (e.g., runners) 82. Cylinders 13 and 18 exhaust the first blowdown portion of the combustion gases to a second manifold portion 85 of first exhaust manifold 84 via first exhaust ports 86 and the second, scavenging portion to second exhaust manifold 80 via second exhaust ports 82. That is, first exhaust ports 86 of cylinders 13 and 18 extend from cylinders 13 and 18 to the second manifold portion 85 of first exhaust manifold 84, whereas first exhaust ports 86 of cylinders 14 and 15 extend from cylinders 14 and 15 to the first manifold portion 81 of first exhaust manifold 84. Second exhaust ports 82 extend from cylinders 13, 14, 15, and 18 to second exhaust manifold 80.

Each exhaust port can selectively communicate with the cylinder it is coupled to via the corresponding exhaust valve. For example, second exhaust ports 82 communicate with their respective cylinders via second exhaust valves 6, and first exhaust ports 86 communicate with their respective cylinders via first exhaust valves 8. Second exhaust ports 82 are isolated from first exhaust ports 86 when at least one exhaust valve of each cylinder is in a closed position. Exhaust gases may not flow directly between second exhaust ports 82 and first exhaust ports 86. The exhaust system described above may be referred to herein as a split exhaust system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another, and thus the first and second portions of exhaust gases do not mix with one another within the first and second exhaust manifolds).

Engine 10 includes a turbocharger including a dual-stage exhaust turbine 164 and an intake compressor 162 coupled on a common shaft (not shown). Dual-stage turbine 164 includes a first turbine 163 and a second turbine 165. First turbine 163 is directly coupled to first manifold portion 81 of first exhaust manifold 84 and receives exhaust gases only from cylinders 14 and 15 via first exhaust valves 8 of cylinders 14 and 15. Second turbine 165 is directly coupled to second manifold portion 85 of first exhaust manifold 84 and receives exhaust gases only from cylinders 13 and 18 via first exhaust valves 8 of cylinders 13 and 18. Rotation of the first and second turbines drives rotation of compressor 162, disposed within the intake passage 28. As such, the intake air becomes boosted (e.g., pressurized) at the compressor 162 and travels downstream to intake manifold 44.

Exhaust gases exit both first turbine 163 and second turbine 165 into a common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve 76 controls an amount of boost provided by the turbocharger. For example, as an opening of wastegate valve 76 increases, an amount of exhaust gas flowing through bypass 78 and not through dual-stage turbine 164 may increase, thereby decreasing an amount of power available for driving dual-stage turbine 164 and compressor 162. As another example, as the opening of wastegate valve 76 decreases, the amount of exhaust gas flowing through bypass 78 decreases, thereby increasing the amount of power available for driving dual-stage turbine 164 and compressor 162. In alternative examples, engine 10 may include a single stage turbine where all exhaust gases from the first exhaust manifold 84 are directed to an inlet of a same turbine.

After exiting dual-stage turbine 164, exhaust gases flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way catalysts. In other examples, emission control devices 70 and 72 may include one or a plurality of a diesel oxidation catalyst (DOC) and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12, which is included in a control system 17, as will be further described below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as a second oxygen sensor 91 positioned between dual-stage turbine 164 and first emission control device 70 and/or a third oxygen sensor 93 positioned downstream of second emission control device 72. As such, second oxygen sensor 91 may be configured to measure the oxygen content of the exhaust gas entering first emission control device 70, and third oxygen sensor 93 may be configured to measure the oxygen content of exhaust gas exiting second emission control device 72. In one example, one or more of oxygen sensor 90, oxygen sensor 91, and oxygen sensor 93 may be universal exhaust gas oxygen (UEGO) sensors. Alternatively, a two-state exhaust gas oxygen sensor may be substituted for one or more of oxygen sensors 90, 91, and 93. Exhaust passage 74 may include various other sensors, such as one or more temperature and/or pressure sensors. For example, as shown in FIG. 1, a sensor 96 is positioned within exhaust passage 74 between first emission control device 70 and second emission control device 72. Sensor 96 may be a pressure and/or temperature sensor. As such, sensor 96 may be configured to measure the pressure and/or temperature of exhaust gas entering second emission control device 72.

Both sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as a scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor 162 (and thus, first EGR passage 50 may be referred to as a low-pressure EGR passage). As such, exhaust gases (or blowthrough air, as explained further below) is directed from second exhaust manifold 80 to air intake passage 28, upstream of compressor 162, via first EGR passage 50. As shown in FIG. 1, first EGR passage 50 may include an EGR cooler 52 configured to cool exhaust gases flowing from second exhaust manifold 80 to intake passage 28 and may further include a first EGR valve 54 (which may be referred to herein as a BTCC valve) disposed therein. Controller 12 is configured to actuate and adjust a position of BTCC valve 54 in order to control a flow rate and/or amount through first EGR passage 50. When the BTCC valve 54 is in a closed (e.g., fully closed) position, no exhaust gases or intake air may flow from second exhaust manifold 80 to intake passage 28, upstream of compressor 162. Further, when the BTCC valve 54 is in an open position (e.g., from partially open to fully open), exhaust gases and/or blowthrough air may flow from second exhaust manifold 80 to intake passage 28, upstream of compressor 162. Controller 12 may additionally adjust the BTCC valve 54 into a plurality of positions between fully open and fully closed. In other examples, controller 12 may only adjust BTCC valve 54 to be either fully open or fully closed. Further, a pressure sensor 53 may be arranged in EGR passage 50 upstream of BTCC valve 54.

A first ejector 56 is positioned at an outlet of EGR passage 50, within intake passage 28. First ejector 56 may include a constriction or venturi that provides a pressure increase at the inlet of compressor 162. As a result, EGR from EGR passage 50 may be mixed with fresh air flowing through intake passage 28 to compressor 162. Thus, EGR from EGR passage 50 may act as the motive flow on first ejector 56. In an alternative example, there may not be an ejector positioned at the outlet of EGR passage 50. Instead, an outlet of compressor 162 may be shaped as an ejector that lowers the gas pressure to assist in EGR flow (and thus, in this example, air is the motive flow and EGR is the secondary flow). In yet another example, EGR from EGR passage 50 may be introduced at a trailing edge of a blade of compressor 162, thereby allowing blowthrough air to be delivered to intake passage 28 via EGR passage 50. An intake pressure sensor 51 may be arranged immediately upstream of the venturi of first ejector 56.

A second EGR passage 58 is coupled between first EGR passage 50 and intake passage 28. Specifically, as shown in FIG. 1, second EGR passage 58 is coupled to first EGR passage 50 between BTCC valve 54 and EGR cooler 52. In other examples, when second EGR passage 58 is included in the engine system, the system may not include EGR cooler 52. Additionally, second EGR passage 58 is directly coupled to intake passage 28, downstream of compressor 162. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and recirculated exhaust gases) as it passes through CAC 40. As such, recirculated exhaust gases from first EGR passage 50 and/or second EGR passage 58 may be cooled via CAC 40 before entering intake manifold 44. In an alternative example, second EGR passage 58 may be coupled to intake passage 28 downstream of CAC 40. In such an example, there may be no EGR cooler 52 disposed within first EGR passage 50. Further, as shown in FIG. 1, a second ejector 57 may be positioned within intake passage 28 at an outlet of second EGR passage 58.

A second (e.g., mid-pressure) EGR valve 59 is disposed within second EGR passage 58. Second EGR valve 59 is configured to adjust an amount of gas flow (e.g., blowthrough air and/or exhaust) through second EGR passage 58. As further described below, controller 12 may actuate EGR valve 59 into an open (e.g., fully open) position (allowing minimally restricted flow thorough second EGR passage 58), a closed (e.g., fully closed) position (blocking flow through second EGR passage 58), or plurality of positions between fully open and fully closed based on (e.g., as a function of) engine operating conditions. For example, actuating EGR valve 59 may include controller 12 sending an electronic signal to an actuator of EGR valve 59 to move a valve plate of EGR valve 59 into the open position, the closed position, or some position between fully open and fully closed. Based on system pressures and positions of various other valves in the engine system, air may either flow toward intake passage 28 within second EGR passage 58 or toward second exhaust manifold 80 within second EGR passage 58.

Intake passage 28 further includes an intake throttle 62. As shown in FIG. 1, intake throttle 62 is positioned downstream of CAC 40. A position of a throttle plate 64 of throttle 62 may be adjusted by controller 12 via a throttle actuator (not shown) communicatively coupled to controller 12. By modulating intake throttle 62 while operating compressor 162, a desired amount of fresh air and/or recirculated exhaust gas may be cooled by CAC 40 and delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from the compressor outlet, upstream of CAC 40, to the compressor inlet. A compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80, and a second end of third flow passage 30 is directly coupled to intake passage 28, downstream of intake throttle 62 and upstream of intake manifold 44. A third valve 32 (e.g., a hot pipe valve) is disposed within third flow passage 30 and is configured to adjust an amount of air flow through third flow passage 30. Third valve 32 may be actuated into a fully open position, a fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38 and/or oxygen sensor 36.

In some examples, as shown in FIG. 1, intake passage 28 may include an electric compressor 60. Electric compressor 60 is disposed in a bypass passage 61, which is coupled to intake passage 28 upstream and downstream of an electric compressor valve 63. Specifically, an inlet to bypass passage 61 is coupled to intake passage 28 upstream of electric compressor valve 63, and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of electric compressor valve 63 in intake passage 28. An intake pressure sensor 31 and an intake temperature sensor 33 are positioned in intake passage 28 upstream of compressor 162 and downstream of where first EGR passage 50 couples to intake passage 28. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62. In some examples, as shown in FIG. 1, an additional intake oxygen sensor 39 may be positioned in intake passage 28 between CAC 40 and throttle 62. Further, an intake manifold pressure (e.g., MAP) sensor 122 and an intake manifold temperature sensor 123 are positioned within intake manifold 44, upstream of the engine cylinders.

Figure 2:
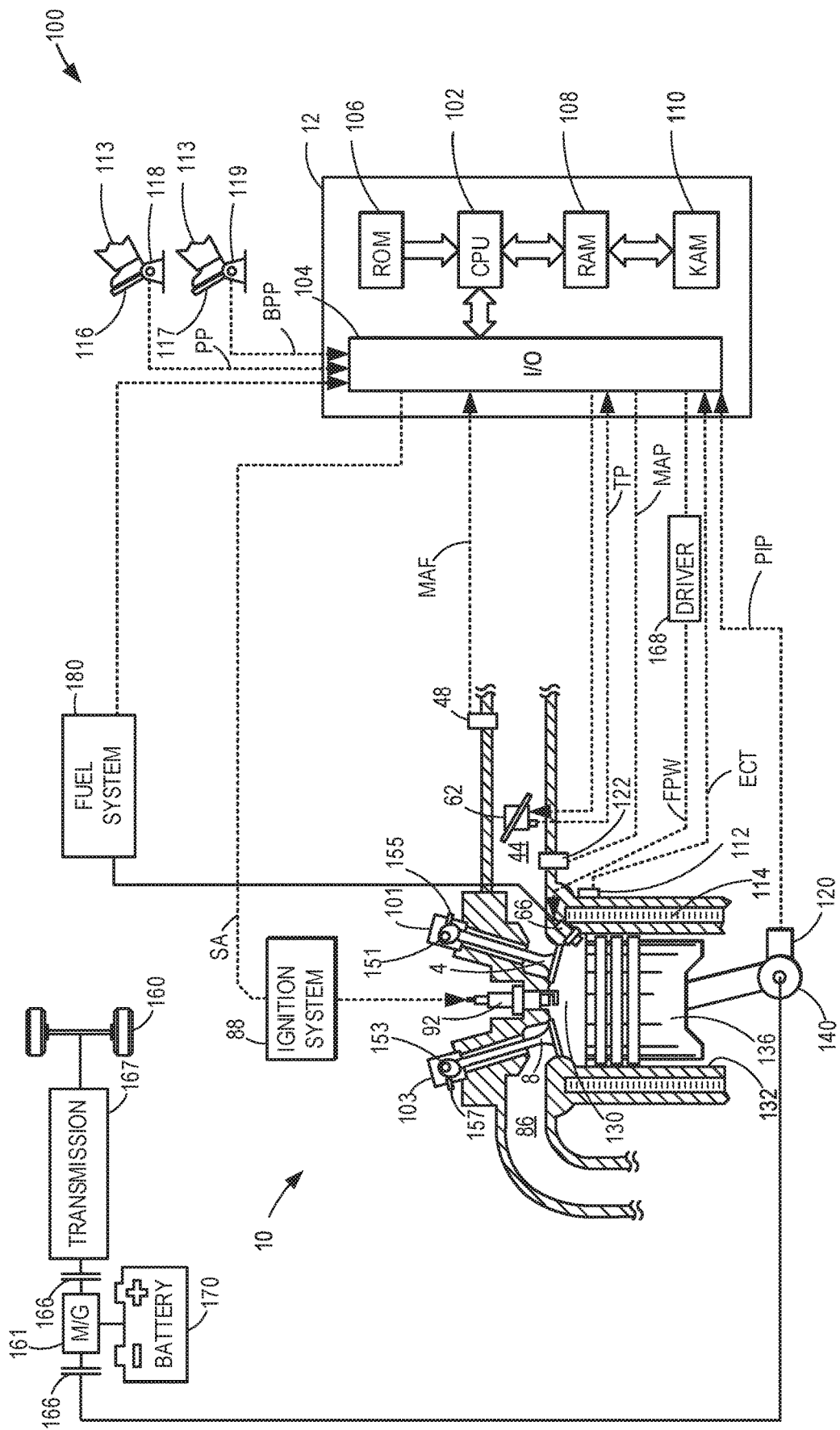
FIG. 2 shows an embodiment of a cylinder of the engine system of FIG. 1.

In some examples, engine 10 may be coupled to an electric motor/battery system (as shown in FIG. 2) in a hybrid vehicle. The hybrid vehicle may have a parallel configuration, a series configuration, or variations or combinations thereof. Further, in some examples, other engine configurations may be employed, for example a diesel engine.

Engine 10 may be controlled at least partially by control system 17, including controller 12, and by input from a vehicle operator via an input device (not shown in FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and second exhaust manifold 80 described above. Other sensors may include a throttle inlet temperature sensor for estimating a throttle air temperature (TCT) coupled downstream of throttle 62 in the intake passage. Additional system sensors and actuators are elaborated below with reference to FIG. 2. As another example, actuators 83 may include fuel injectors 66, valves 63, 42, 54, 59, 32, 97, 76, and throttle 62. Actuators 83 may further include various camshaft timing actuators coupled to the cylinder intake and exhaust valves (as described below with reference to FIG. 2). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 7.

For example, a total flow through a scavenge EGR passage and individual concentrations of constituents within the total flow may be determined based on the valve overlap between the scavenge valve and intake valves, the valve overlap determined based on intake and exhaust cam timings. The controller may then adjust an engine operating parameter, such a position of one or more valves and exhaust and/or intake cam timings, based on the determined total flow and concentrations of constituents through the scavenge EGR passage.

It should be noted that while FIG. 1 shows engine 10 including each of first EGR passage 50, second EGR passage 58, flow passage 98, and flow passage 30, in other examples, engine 10 may only include a portion of these passages. For example, engine 10 may only include first EGR passage 50 and flow passage 98 and not include second EGR passage 58 and flow passage 30. In another example, engine 10 may include first EGR passage 50, second EGR passage 58, and flow passage 98, but not include flow passage 30. In yet another example, engine 10 may include first EGR passage 50, flow passage 30, and flow passage 98, but not second EGR passage 58. In some examples, engine 10 may not include electric compressor 60. In still other examples, engine 10 may include all or only a portion of the sensors shown in FIG. 1.

Referring now to FIG. 2, a partial view of a single cylinder of internal combustion engine 10 is shown. As such, components previously introduced in FIG. 1 are represented with the same reference numbers and are not re-introduced. Engine 10 is depicted with combustion chamber (cylinder) 130, which may represent any of cylinders 13, 14, 15, and 18 of FIG. 1. Combustion chamber 130 includes a coolant sleeve 114 and cylinder walls 132, with a piston 136 positioned therein and connected to a crankshaft 140. Combustion chamber 130 is shown communicating with intake manifold 44 and first exhaust port 86 via intake valve 4 and first exhaust valve 8, respectively. As previously described in FIG. 1, each cylinder of engine 10 may exhaust combustion products along two conduits, and only the first exhaust port (e.g., runner) leading from the cylinder to the turbine is shown in FIG. 2, while the second exhaust port (e.g., second exhaust port 82) is not visible in this view.

As also previously elaborated in FIG. 1, each cylinder of engine 10 may include two intake valves and two exhaust valves. In the depicted view, only one intake valve (e.g., intake valve 4) and first exhaust valve 8 are shown. Intake valve 4 and first exhaust valve 8 are located at an upper region of combustion chamber 130. Intake valve 4 and first exhaust valve 8 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve, including intake valve 4, is controlled by an intake cam 151, and each exhaust valve, including first exhaust valve 8, is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the first exhaust valve 8 such that it remains closed and does not open at its set timing. The position of intake camshaft 151 and exhaust camshaft 153 may be determined by camshaft position sensors 155 and 157, respectively. As introduced above, in one example, all exhaust valves of every cylinder may be controlled on a same exhaust camshaft. As such, a timing of both of the scavenge (second) exhaust valve and the blowdown (first) exhaust valve may be adjusted together via one camshaft, but they may each have different timings relative to one another. In another example, the blowdown exhaust valve of every cylinder may be controlled via a first exhaust camshaft, and a scavenge exhaust valve of every cylinder may be controlled on via different, second exhaust camshaft. In this way, the valve timing of the scavenge valves and blowdown valves may be adjusted separately from one another. In alternative examples, the cam or valve timing system(s) of the scavenge and/or blowdown exhaust valves may employ a cam in cam system, an electrohydraulic-type system on the scavenge valves, and/or an electro-mechanical valve lift control on the scavenge valves.

In some examples, the intake and/or exhaust valves may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at lower cylinder pressures from exhaust gases exhausted at higher cylinder pressures. For example, a first exhaust cam profile can open the first exhaust valve (e.g., blowdown valve) from a closed position just before bottom dead center (BDC) of the power stroke of combustion chamber 130 and close the same exhaust valve well before top dead center (TDC) of the exhaust stroke to selectively exhaust blowdown gases from the combustion chamber. Further, a second exhaust cam profile can be used to open the second exhaust valve (e.g., scavenge valve) from a closed position before a mid-point of the exhaust stroke and close it after TDC to selectively exhaust the scavenging portion of the exhaust gases. Example valve timings will be described below with respect to FIG. 3.

Thus, the timing of the first exhaust valve and the second exhaust valve can isolate cylinder blowdown gases from a scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine (e.g., turbine 165 introduced in FIG. 1) and a higher pressure exhaust passage and flowing a later, second portion of the exhaust gas (e.g., lower pressure exhaust) and blowthrough air to the compressor inlet (e.g., an inlet of compressor 162 introduced in FIG. 1), the engine system efficiency may be increased.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include spark plug 92 for initiating combustion. Ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse width of a signal FPW received from controller 12 via an electronic driver 168. In this manner, fuel injector 66 provides what is known as direct injection (hereafter also referred to as "DI") of fuel into cylinder 130. While FIG. 2 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Figure 3:
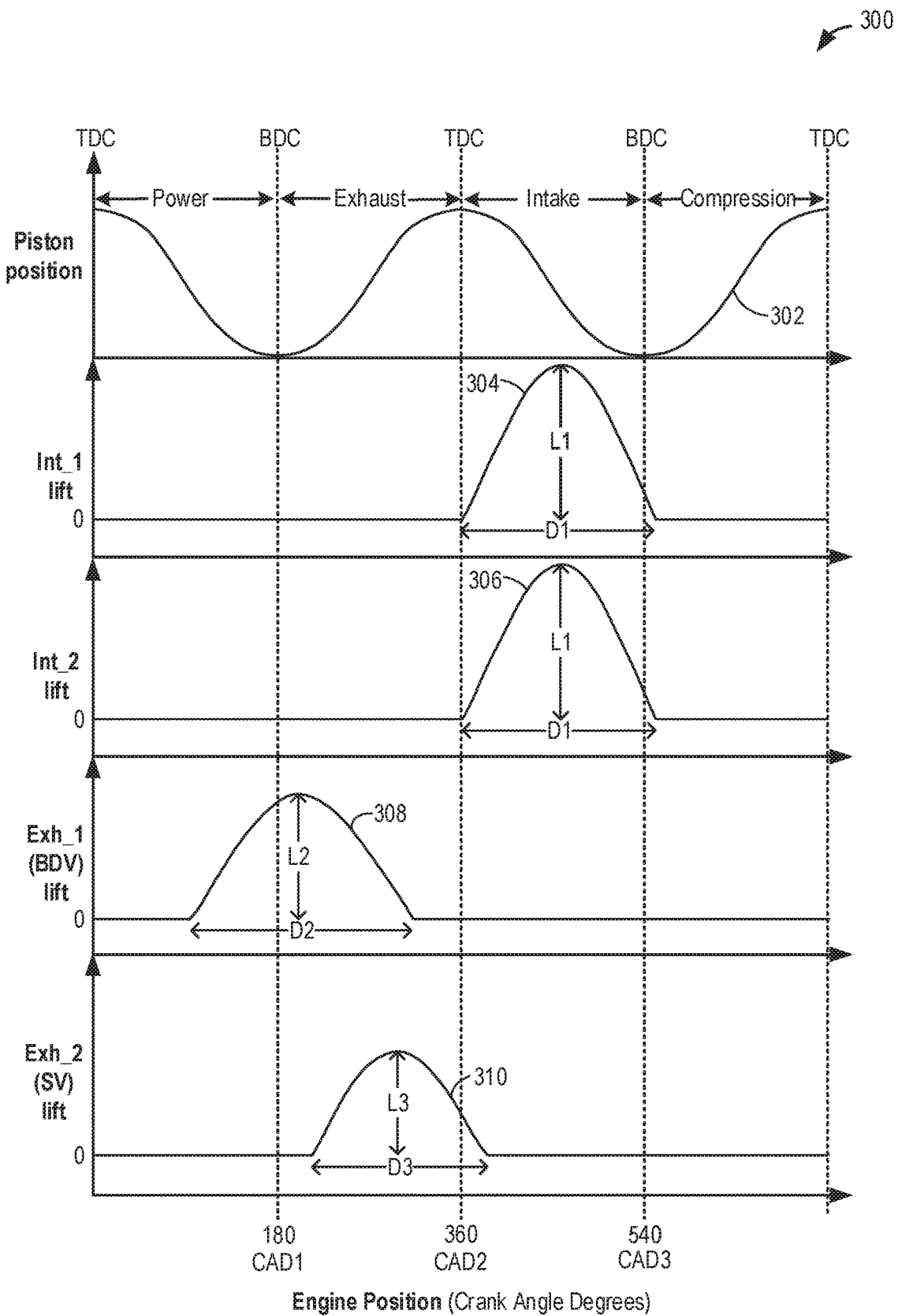
FIG. 3 shows example cylinder intake valve and exhaust valve timings for one engine cylinder of a split exhaust engine system.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 3 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from MAP sensor 122. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines, an example of which is described herein with respect to FIG. 7.

In some examples, the vehicle may be a hybrid vehicle with multiple sources of torque available to one or more vehicle wheels 160. In other examples, the vehicle is a conventional vehicle with only an engine. In the example shown in FIG. 2, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Now turning to FIG. 3, graph 300 depicts example valve timings with respect to a piston position for an engine cylinder comprising four valves: two intake valves and two exhaust valves, such as described above with reference to FIGS. 1 and 2. The cylinder is configured to receive intake air via the two intake valves (e.g., intake valves 2 and 4 introduced in FIG. 1), exhaust a first, blowdown portion of exhaust gas to a turbine inlet via a blowdown exhaust valve (e.g., first, or blowdown, exhaust valve 8 introduced in FIG. 1), exhaust a second, scavenging portion of exhaust gas to an intake passage via a scavenge exhaust valve (e.g., second, or scavenge, exhaust valve 6 introduced in FIG. 1), and provide non-combusted blowthrough air to the intake passage via the scavenge exhaust valve. By adjusting the timing of the opening and/or closing of the scavenge exhaust valve with that of the two intake valves, residual exhaust gases in the cylinder clearance volume may be flushed out and recirculated as EGR along with fresh intake blowthrough air.

Graph 300 illustrates an engine position along the horizontal axis in crank angle degrees (CAD). In the example of FIG. 3, relative differences in timings can be estimated by the drawing dimensions. However, other relative timings may be used, if desired. Plot 302 depicts piston position (along the vertical axis) relative to top dead center (TDC), bottom dead center (BDC), and the four strokes of an engine cycle (intake, compression, power, and exhaust). During the intake stroke, generally, the exhaust valves close and intake valves open. Air is introduced into the cylinder via the intake manifold and the corresponding intake ports, and the piston moves to the bottom of the cylinder so as to increase the volume within the cylinder. The position at which the piston is at its bottom-most position in the cylinder and at the end of its stroke (e.g., when the combustion chamber is at its largest volume) is typically referred to as BDC. During the compression stroke, the intake valves and the exhaust valves are closed. The piston moves toward the cylinder head so as to compress the air within the cylinder. The point at which the piston is at the end of its stroke and closest to the cylinder head (e.g., when the combustion chamber is at its smallest volume) is typically referred to as TDC. In a process herein referred to as injection, fuel is introduced into the combustion chamber. In a process herein referred to as ignition, the injected fuel is ignited, such as via a spark from a spark plug, resulting in combustion. During the expansion stroke, the expanding gases push the piston back down to BDC. A crankshaft (e.g., crankshaft 140 shown in FIG. 2) converts this piston movement into a rotational torque of the rotary shaft. During the exhaust stroke, the exhaust valves are opened to release the combusted air-fuel mixture to the corresponding exhaust passages, and the piston returns to TDC. In this description, the second exhaust (scavenge) valves may be opened after the beginning of the exhaust stroke and may stay open until after the end of the exhaust stroke, while the first exhaust (blowdown) valves are closed and the intake valves are opened to flush out residual exhaust gases with blowthrough air.

Plot 304 depicts an intake valve timing, lift, and duration for a first intake valve (Int_1), while plot 306 depicts an intake valve timing, lift, and duration for a second intake valve (Int_2), both intake valves coupled to the intake passage of the engine cylinder. Plot 308 depicts an example exhaust valve timing, lift, and duration for a blowdown exhaust valve (Exh_1), which may correspond to first (e.g., blowdown) exhaust valve 8 introduced in FIG. 1, coupled to a first exhaust manifold (e.g., blowdown exhaust manifold 84 shown in FIG. 1) of via a first exhaust port (e.g., first exhaust port 86 of FIG. 1). Plot 310 depicts an example exhaust valve timing, lift, and duration for a scavenge exhaust valve (Exh_2), which may correspond to second (e.g., scavenge) exhaust valve 6 shown in FIG. 1, coupled to a scavenge manifold (e.g., scavenge manifold 80 shown in FIG. 1) via a second exhaust port (e.g., second exhaust port 82 of FIG. 1). As previously elaborated, the first exhaust manifold connects (e.g., fluidly couples) the blowdown exhaust valve to the inlet of a turbocharger turbine (e.g., turbine 165 of FIG. 1), and the scavenge manifold connects (e.g., fluidly couples) the scavenge exhaust valve to an intake passage via an EGR passage (e.g., first EGR passage 50 shown in FIG. 1). The first exhaust manifold may be separate from the scavenge manifold, as explained above.

In the depicted example, the first and second intake valves are fully opened from a closed position (e.g., a valve lift of zero) at a common timing (plots 304 and 306), beginning near the intake stroke TDC just after CAD2 (e.g., at or just after the intake stroke TDC), and are closed after a subsequent compression stroke has commenced past CAD3 (e.g., after BDC). Additionally, when opened fully, the two intake valves may be opened with a same amount of valve lift L1 for a same duration of D1. In other examples, the two intake valves may be operated with a different timing by adjusting the phasing, lift, or duration. In contrast to the common timing of the first and second intake valves, the timing of the blowdown exhaust valve opening and closing may be staggered relative to the scavenge exhaust valve opening and closing. Specifically, the blowdown exhaust valve (plot 308) is opened from a closed position at a first timing that is earlier in the engine cycle than the timing at which the scavenge exhaust valve (plot 310) is opened from a closed position. Specifically, the first timing for opening the blowdown exhaust valve is between TDC and BDC of the power stroke, before CAD1 (e.g., before the exhaust stroke BDC), while the timing for opening the scavenge exhaust valve is just after the exhaust stroke BDC, after CAD1 but before CAD2. The blowdown exhaust valve (plot 308) is closed before the end of the exhaust stroke, and the scavenge exhaust valve (plot 310) is closed after the end of the exhaust stroke. Thus, the scavenge exhaust valve remains open to overlap slightly with opening of the intake valves.

To elaborate, the blowdown exhaust valve (plot 308) may be fully opened from close before the start of an exhaust stroke (e.g., between 90 and 30 degrees before BDC, depending on cam phasing), maintained fully open through a first part of the exhaust stroke, and may be fully closed before the exhaust stroke ends (e.g., between 50 and 0 degrees before TDC, depending on cam phasing) to collect the blowdown portion of the exhaust pulse. The scavenge exhaust valve (plot 310) may be fully opened from a closed position just after the beginning of the exhaust stroke (e.g., between 30 and 90 degrees past BDC, depending on cam phasing), maintained open through a second portion of the exhaust stroke, and may be fully closed after the intake stroke begins (e.g., between 20 and 70 degrees after TDC, depending on cam phasing) to exhaust the scavenging portion of the exhaust. Additionally, the scavenge exhaust valve and the intake valves, as shown in FIG. 3, may have a positive overlap phase (e.g., from between 20 degrees before TDC and 30 degrees after TDC until between 30 and 90 degrees past TDC, depending on cam phasing) to allow blowthrough with EGR. This cycle, wherein all four valves are operational, may repeat itself based on engine operating conditions.

Additionally, the blowdown exhaust valve (plot 308) may be opened with a first amount of valve lift L2, while the scavenge exhaust valve (plot 310) may be opened with a second amount of valve lift L3, where L3 is smaller than L2. Further still, the blowdown exhaust valve may be opened at the first timing for a duration D2, while the scavenge exhaust valve may be opened for a duration D3, where D3 is smaller than D2. It will be appreciated that in other examples, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in the cylinder) from residual exhaust gases at low pressure (e.g., exhaust gases that remain in the cylinder after blowdown) into the different manifolds. Further, by conveying low pressure residual exhaust gases as EGR along with blowthrough air to the compressor inlet (via the first EGR passage and the scavenge manifold), combustion chamber temperatures can be lowered, thereby reducing an occurrence of knock and an amount of spark retard from maximum brake torque timing. Further, because the exhaust gases at the end of the exhaust stroke are directed to either downstream of the turbine or upstream of the compressor, which are both at lower pressures, exhaust pumping losses can be minimized to increase engine efficiency.

Thus, exhaust gases can be used more efficiently than simply directing all the exhaust gas of a cylinder through a single, common exhaust port to the turbocharger turbine. As such, several advantages may be achieved. For example, the average exhaust gas pressure supplied to the turbocharger can be increased by separating and directing the blowdown pulse into the turbine inlet to increase turbocharger output. Additionally, fuel economy may be increased because blowthrough air is not routed to the catalyst, being directed to the compressor inlet instead, and therefore, excess fuel may not be injected into the exhaust gases to maintain a stoichiometric air-fuel ratio upstream of the catalyst.

However, a composition of the gas conveyed through the scavenge exhaust valve to the compressor inlet (via the first EGR passage and the scavenge manifold) varies throughout the scavenge exhaust valve open duration and further varies based on operating parameters, such as a duration of the positive valve overlap phase between the scavenge exhaust valve and the intake valves, relative pressures of the intake manifold and the scavenge manifold, and a timing of a fuel direct injection relative to a closing timing of the scavenge exhaust valve. Therefore, FIGS. 4A-4D schematically illustrate sources of different recirculated gases throughout an open duration of the scavenge exhaust valve. Specifically, a cylinder diagram 400 in each of FIGS. 4A-4D schematically depicts gas flow through the cylinder at an engine position shown in a corresponding valve diagram 450. Components of cylinder diagram 400 that are the same as the components shown in FIGS. 1 and 2 are numbered the same and may not be reintroduced. Valve diagram 450 shows engine position along the horizontal axis (in crank angle degrees after TDC of the intake stroke) and valve lift along the vertical axis (in millimeters). An example valve timing, lift, and duration for a set of intake valves is shown in plot 404 (e.g., intake valves 2 and 4 introduced in FIG. 1 and shown in cylinder diagram 400), an example valve timing, lift, and duration for a first, blowdown exhaust valve is shown in plot 408 (e.g., blowdown exhaust valve 8 introduced in FIG. 1 and shown in cylinder diagram 400), and an example valve timing, lift, and duration for a second, scavenge exhaust valve is shown in plot 410 (e.g., scavenge exhaust valve 6 introduced in FIG. 1 and shown in cylinder diagram 400).

Turning first to FIG. 4A, cylinder diagram 400 shows gas flow through scavenge exhaust valve 6 at a first engine position indicated by a dashed line 416 on valve diagram 450. The first engine position occurs during an exhaust stroke, just before TDC of the intake stroke. Intake valves 2 and 4 are closed at the first engine position, as indicated by black filled circles for intake valves 2 and 4 in cylinder diagram 400 and as shown by plot 404 in valve diagram 450. Blowdown exhaust valve 8 is also substantially closed at the first engine position. Scavenge exhaust valve 6 is open at the first engine position, as indicated by a white filled circle for scavenge exhaust valve 6 in cylinder diagram 400 and as shown by plot 410 in valve diagram 450. With the intake valves closed, residual gases 414 from combustion (also referred to herein as combustion products) that have not already exited the cylinder as blowdown exhaust (e.g., via blowdown exhaust valve 8) flow from cylinder 130 through the open scavenge exhaust valve 6 and toward scavenge manifold 80 via second exhaust port 82. Further, with blowdown exhaust valve 8 substantially closed at the first engine position, the residual gases 414 do not flow through the blowdown exhaust valve and toward first exhaust manifold 84 via first exhaust port 86. For example, a blowdown portion of residual gases 414 may have already been exhausted through blowdown exhaust valve 8 earlier in the engine cycle (e.g., at a more negative crank angle with respect to TDC of the intake stroke) while blowdown exhaust valve 8 was open (e.g., as shown in plot 408). Residual gases (e.g., combustion gases) 414 may be comprised of burnt gases, a mixture of burnt gases and air, and/or a mixture of burnt gases and unburned hydrocarbons injected during the previous engine cycle, for example.

Turning next to FIG. 4B, cylinder diagram 400 shows gas flow through scavenge exhaust valve 6 at a second engine position indicated by a dashed line 418 on valve diagram 450. The second engine position occurs during the intake stroke, shortly after TDC. Intake valves 2 and 4 are open at the second engine position, as indicated by white filled circles for intake valves 2 and 4 in cylinder diagram 400 and as shown by plot 404 in valve diagram 450. Blowdown exhaust valve 8 is fully closed at the second engine position. Scavenge exhaust valve 6 remains open at the second engine position, as indicated by a white filled circle for scavenge exhaust valve 6 in cylinder diagram 400 and as shown by plot 410 in valve diagram 450. With the intake valves open, pushback gases 420 flow from intake ports 20 and 22, though the open intake valves 2 and 4, through cylinder 130, through the open scavenge exhaust valve 6, and toward scavenge manifold 80 via second exhaust port 82. Further, with blowdown exhaust valve 8 fully closed at the second engine position, the pushback gases 420 do not flow through the blowdown exhaust valve and toward first exhaust manifold 84 via first exhaust port 86. Pushback gases 420 may be comprised of a mixture of burnt gases, air, and/or unburned hydrocarbons injected during the previous engine cycle. For example, while intake valves 2 and 4 are open, gas may flow from cylinder 130 to intake ports 20 and 22 based on an in-cylinder pressure and a pressure in the intake ports (e.g., based on MAP) and may remain in the intake ports upon intake valve closing. Further, an amount of unburned hydrocarbons in the pushback gases 420 varies based on an amount of overlap between a start of injection (SOI) of a fuel direct injection and a closing timing of scavenge exhaust valve 6. Then, during a subsequent engine cycle, pushback gases 420 may flow from intake ports 20 and 22 into cylinder 130 upon intake valve opening, and at least a portion of the pushback gases 420 may then flow through scavenge exhaust valve 6 onto scavenge manifold 80.

Figure 4C:
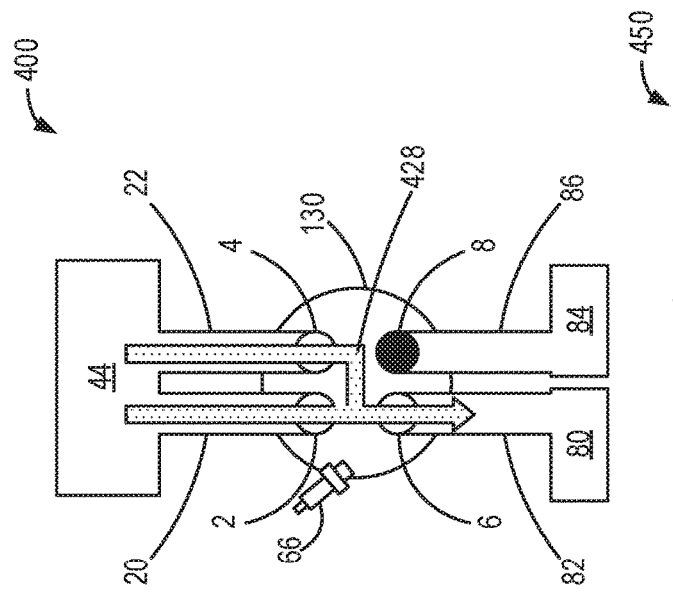
Figure 4C:
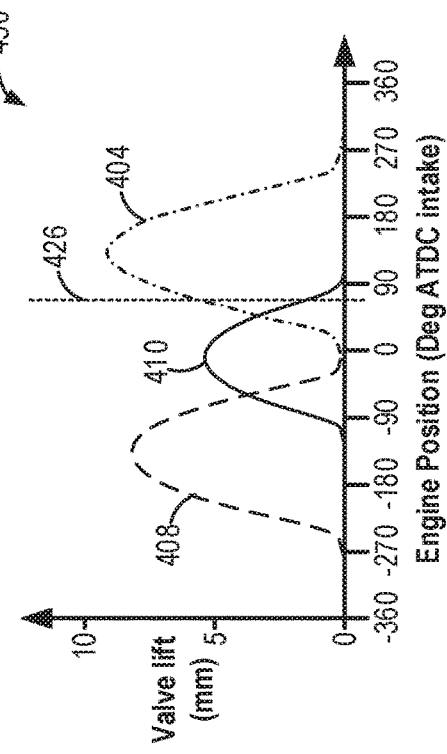

Next, cylinder diagram 400 of FIG. 4C shows gas flow through scavenge exhaust valve 6 at a third engine position indicated by a dashed line 422 on valve diagram 450. Intake valves 2 and 4 are open at the third engine position, as indicated by white filled circles for intake valves 2 and 4 in cylinder diagram 400 and as shown by plot 404 in valve diagram 450. Blowdown exhaust valve 8 is fully closed at the third engine position. Scavenge exhaust valve 6 remains open at the third engine position, as indicated by a white filled circle for scavenge exhaust valve 6 in cylinder diagram 400 and as shown by plot 410 in valve diagram 450. Fuel is directly injected into cylinder 130 via fuel injector 66 at the third engine position. With the scavenge exhaust valve open, short-circuited (e.g., scavenged) fuel 424 from the fuel direct injection flows directly through scavenge exhaust valve 6 and toward scavenge manifold 80 via second exhaust port 82. An amount of the short-circuited fuel 424 varies based on an amount of overlap between the SOI of the fuel direct injection and a closing timing of scavenge exhaust valve 6, an intake-to-scavenge manifold flow, a duration of the positive overlap between intake valves 2 and 4 and scavenge exhaust valve 6, an amount of flow through a scavenge manifold bypass passage (e.g., SMBP 98 shown in FIG. 1), an amount of fuel injected in the fuel direct injection, an end of injection (EOI) timing of the fuel direct injection, and a relative pressure between the scavenge manifold and the intake. That is, a portion of the directly injected fuel may flow through scavenge exhaust valve 6 as short-circuited fuel 242, with the portion varying (relative to a total amount of fuel directly injected) based on pressure and flow characteristics of the scavenge manifold and the intake manifold and the amount of overlap between the direct injection and an open duration of scavenge exhaust valve 6.

Figure 4D:
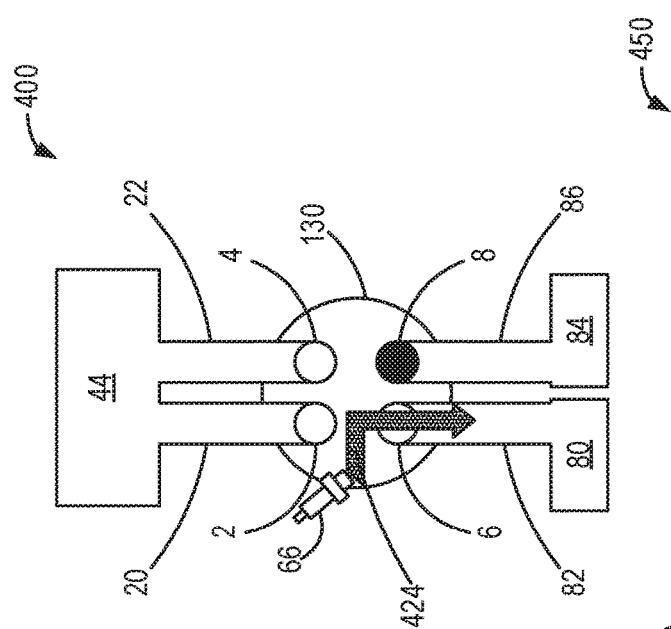
Figure 4D:
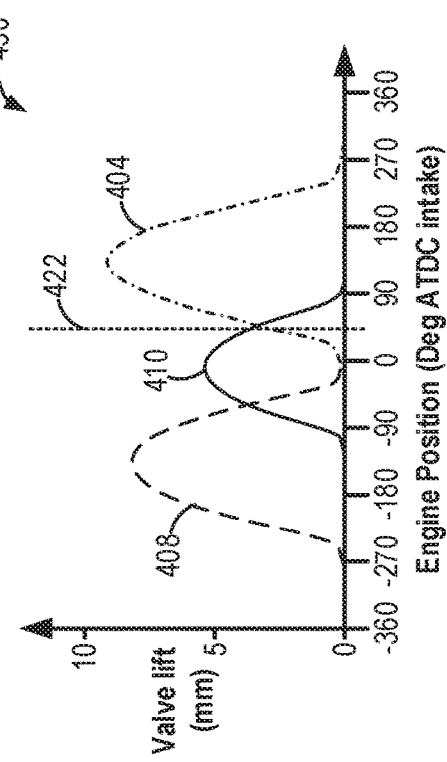

In FIG. 4D, cylinder diagram 400 shows gas flow through scavenge exhaust valve 6 at a fourth engine position indicated by a dashed line 426 on valve diagram 450. Intake valves 2 and 4 are open at the fourth engine position, as indicated by white filled circles for intake valves 2 and 4 in cylinder diagram 400 and as shown by plot 404 in valve diagram 450. Blowdown exhaust valve 8 is fully closed at the fourth engine position. Scavenge exhaust valve 6 remains open at the fourth engine position, as indicated by a white filled circle for scavenge exhaust valve 6 in cylinder diagram 400 and as shown by plot 410 in valve diagram 450. With the intake valves open, intake manifold gases 428 flow from intake manifold 44, through intake ports 20 and 22 to the open intake valves 2 and 4, through cylinder 130, through the open scavenge exhaust valve 6, and toward scavenge manifold 80 via second exhaust port 82. Further, with blowdown exhaust valve 8 fully closed at the fourth engine position, the intake manifold gases 428 do not flow through the blowdown exhaust valve and toward first exhaust manifold 84 via first exhaust port 86. Intake manifold gases 428 may be comprised of fresh air, recirculated burnt gases (e.g., as recirculated by first EGR passage 50 shown in FIG. 1), and, in some examples, recirculated (unburnt) fuel, for example. For example, fuel scavenged during a first engine cycle may be recirculated through an EGR passage (e.g., first EGR passage 50 shown in FIG. 1) to intake manifold 44. Then, during a second, subsequent engine cycle, the fuel scavenged during the first engine cycle may flow from intake manifold 44 into cylinder 130. In some examples, at least a portion of the fuel scavenged during the first engine cycle may further flow through the open scavenge exhaust valve 6 during the second engine cycle as intake manifold gases 428.

Thus, FIGS. 4A-4D, show different sources of recirculated gases throughout the open duration of the second (e.g., scavenge) exhaust valve. The different sources of recirculated gases may supply gases of varying composition, which may further vary based on scavenge valve timing, intake valve timing, fuel injection timing, and pressure and flow characteristics. A timing of the intake valves, scavenge exhaust valve, and thus the opening overlap between the intake valves and scavenge exhaust valve, affect the relative portions of residual gases (e.g., combustion gases), pushback gases, and intake manifold gases that enter the scavenge exhaust manifold, as described further below with reference to FIGS. 5 and 6A-6B.

As explained above, estimating the amount of burnt gases, air (e.g., fresh air), and unburned hydrocarbons flowing to the intake passage via the EGR passage and scavenge exhaust manifold is difficult due to the system architecture and valve timings, which results in various portions of gases pushed into the scavenge manifold at various times (as described above with reference to FIGS. 4A-4D). In order to estimate the flow amounts of each of the recirculated constituents (air, fuel, and burnt gases) in the EGR passage (to the intake passage, upstream of the compressor), first an estimate of the total bulk flow (e.g., flow of all gases, including burnt gases, air, and fuel) through the EGR passage from the scavenge manifold may be needed. Previously, this total flow measurement through the EGR passage and across the EGR valve (e.g., BTCC valve 54 shown in FIG. 1) may be determined via a delta pressure measurement system (e.g., DPFE system) using a differential pressure sensor arranged across the EGR valve and an associated orifice (using a rocket nozzle or venturi, for example). However, this measurement may require a significant delta pressure across the orifice, which may limit engine performance at high load conditions. Thus, instead, the inventors herein propose estimating the bulk flow through the EGR passage and across the BTCC valve based on the valve opening overlap between the intake valves and scavenge exhaust valve and a pressure drop across the overlap (e.g., a difference in pressure between the intake manifold and scavenge exhaust manifold). Then, by mapping a relationship between valve opening overlap between the intake valves and scavenge exhaust valve (e.g., the relative intake valve and scavenge valve timings) and the relative mass fractions of intake gases, pushback gases, and combustion products within the total bulk EGR flow, the flow amounts of each of burnt gases, fuel, and air through the EGR passage to the intake passage, upstream of the compressor, may be determined. These values may then be used for engine control. Details of this method are described below with reference to FIG. 7.

Turning to FIG. 7, a method 700 is shown for determining total flow through a scavenge EGR passage (an EGR passage from a scavenge exhaust manifold to an intake passage, upstream of a compressor) and relative concentrations of burnt gases, fuel, and air within the total flow. In one embodiment, the scavenge EGR passage may be EGR passage 50 shown in FIG. 1, and the flow through the scavenge EGR passage may be referred to as the SC-EGR flow. Instructions for carrying out method 700 may be executed by a controller based on instructions stored on a memory of the controller and in conjunction with signals received from sensors of the engine system, such as the sensors described above with reference to FIGS. 1 and/or 2. The controller may employ engine actuators of the engine system to adjust engine operation, according to the methods described below.

Method 700 begins at 702, which includes estimating and/or measuring operating conditions. Operating conditions may include, for example, a brake pedal position, an acceleration pedal position, operator torque demand, ambient temperature and humidity, barometric pressure, engine speed, engine load, engine temperature, mass air flow (MAF), intake manifold pressure (MAP), intake manifold temperature, oxygen content of intake air/exhaust gases at various points in the engine system, a desired air-fuel ratio (AFR), an actual AFR, a timing of the cylinder intake and exhaust valves, positions of various valves of the engine system (including the BTCC valve), a temperature and/or loading level of one or more emission control devices, pressures in the exhaust system (e.g., exhaust manifolds, exhaust ports, and/or exhaust passages), etc. The operating conditions may be measured or inferred based on available data.

At 704, the method includes determining the timing of the intake valves (e.g., of intake valves 2, 4 shown in FIG. 1) and the timing of the scavenge exhaust valves (e.g., second exhaust valves 6 shown in FIG. 1). The valve timings may be determined in terms of engine position (e.g., crank angle degrees). For example, the crank angle degrees at which the intake valves of a cylinder open and close may be determined, as well as the crank angle degrees at which the scavenge exhaust valve of the cylinder opens and closes. The method at 704 may further include determining the opening overlap between the scavenge exhaust valve and intake valves for a cylinder (e.g., the SV-IV overlap). The SV-IV overlap may be a number of crank angle degrees for which both the intake valves and the corresponding scavenge exhaust valve for a cylinder are open at the same time in a cylinder cycle. Additionally, the method at 704 may include determining, based on the determined valve timings, the current valve lift of each of the scavenge valve and the intake valves, for the current time in the engine cycle (e.g., at the current crank angle degree in the engine cycle). This information may be used to determine the (e.g., instantaneous) valve overlap area between the scavenge valve and intake valves, as described further below at 708.

Method 700 continues to 706 to determine the intake manifold pressure and scavenge (exhaust) manifold pressure. In one embodiment, the intake manifold and scavenge manifold pressures may be estimated based on additional engine operating conditions, such as pressures and/or flows upstream and/or downstream of the desired locations. In another embodiment, the intake manifold and scavenge manifold pressures may be measured. As one example, the intake manifold pressure may be estimated and/or measured from an output of a pressure sensor arranged within the intake manifold (e.g., intake pressure sensor 37 shown in FIG. 1). As another example, the scavenge manifold pressure may be estimated and/or measured from an output of a pressure sensor arranged within the scavenge manifold (e.g., pressure sensor 34 arranged in second exhaust manifold 80). When measuring the intake manifold pressure and scavenge manifold pressure, these pressure measurements may be obtained from the corresponding pressure sensors via high-frequency sampling (e.g., one millisecond or 5 degree sampling). Further, these pressure measurements may be crank angle aligned so that the current intake manifold pressure and scavenge manifold pressures at the current time in the engine cycle may be obtained and used in conjunction with the current valve overlap area at 708, as described further below.

At 708, the method includes determining the total flow (also referred to herein as total bulk flow) through the scavenge EGR passage, from the scavenge manifold to the intake passage, upstream of the compressor, using the determined valve timings (determined at 704, and used to determine the valve overlap area between the scavenge valve and intake valves) and the determined pressures (determined at 706) at a current time in the engine cycle. A cylinder, between the intake valves and scavenge exhaust valve, may be modeled as a variable orifice device that controls the flow through the cylinder and into the scavenge manifold using the relative openings between the scavenge exhaust valve and intake valves (of the cylinder) during the SV-IV overlap period (where the intake valves and scavenge valve of a cylinder are all at least partially open). The flow rate through this "orifice", and thus into the scavenge manifold, may be related to the flow area (e.g., overlap area between the intake valves and scavenge valve) of the orifice using a standard orifice equation. An example of such an orifice equation, used to determine total flow across an orifice (in this case, considered to be between the scavenge valve and the corresponding intake valves), is presented by the equations below.

$$Q_{SV-IV} = g_1(P_{IM}, P_{SM})g_2(\theta), \quad \text{(Equation 1)}$$

$$g_1(P_{IM}, P_{SM}) = \quad \text{(Equation 2)}$$

$$\frac{A_{SV-IV}P_{SM}}{\sqrt{R_{air}T_{IM}}}\left(\frac{P_{IM}}{P_{SM}}\right)^{\frac{1}{\gamma}}\sqrt{\frac{2\gamma}{\gamma-1}\left[1-\left(\frac{P_{IM}}{P_{SM}}\right)^{\frac{\gamma-1}{\gamma}}\right]},$$

$$g_2(\theta) = C_D(\theta), \quad \text{(Equation 3)}$$

where $Q_{SV-IV}$ is the total flow through the cylinder, from the intake valves to the scavenge valve, which may be assumed to be the total bulk flow through the scavenge EGR passage. In the above equations, PIM is the intake manifold pressure, $P_{SM}$ is the scavenge manifold pressure, and $\theta$ is the relative opening angle between the intake valve and scavenge valve (e.g., fraction or percentage opening overlap out of a total amount of possible overlap between the intake valves and scavenge valve). In Equation 2, $A_{SV-IV}$ is the valve overlap area between the intake valves and the scavenge valve (which is a function of the valve lift profiles for the intake valves and scavenge valves at the current crank angle), $R_{air}$ is the universal gas constant of air, $T_{IM}$ is the temperature in the intake manifold, and $\gamma$ is the specific weight of the gases. In Equation 3, $C_D(\theta)$ is an angle dependent discharge coefficient. The multiplication of area and discharge coefficient provide an equivalent effect to the valve overlap factor. Thus, using an orifice equation, such as those presented above in Equations 1-3, the determined intake manifold and scavenge manifold pressures at the current crank angle, and the valve overlap area at the current crank angle, the current flow through the scavenge EGR passage may be determined. This total bulk flow amount may change over time, as the pressures and valve overlap area changes.

In one embodiment, the method at 708 may additionally include, at 710, filtering out an effect of pulsation on scavenge manifold pressure and estimating a transport delay in the determined total flow through the scavenge EGR passage based on engine speed. For example, as engine speed increases, the amount of pulsations in the flow may also increase. Thus, a relationship between engine speed and scavenge manifold pressure pulsations may be determined (e.g., from engine mapping/modeling) and stored in the memory of the controller as a look-up table or mathematical relationship, where engine speed in the input, and a correction to the determined (e.g., measured) scavenge manifold pressure is the output. Thus, based on a determined engine speed (e.g., estimated and/or measured from one or more engine sensors), the controller may input the engine speed into the stored look-up table or relationship and receive a scavenge manifold pressure correction as the output. The controller may then correct the measured or estimated scavenge manifold pressure using the determined correction and use the corrected scavenge manifold pressure in the orifice equation to determine the total bulk flow through the scavenge EGR passage, as described above. Similarly, a transport delay may be determined based on a measured and/or estimated engine speed and used to adjust or update the determined total bulk flow through the scavenge EGR passage.

Continuing to 712, the method includes determining scavenge manifold mass fractions of scavenge manifold gas portions based on the valve opening overlap between the scavenge valve and intake valves. The scavenge manifold gas portions (e.g., portions of gases expelled into the scavenge manifold and recirculated to the intake passage via the scavenge EGR passage, as described above with reference to FIGS. 4A-4D) include pushback gases (e.g., pushback gases 420 shown in FIG. 4B), combustion products (e.g., residual gases 414 shown in FIG. 4A), and intake manifold gases (e.g., intake manifold gases 428 shown in FIG. 4D). While not explicitly shown in the breakdown of FIG. 5, the impact of short-circuiting of direct injected (DI) fuel on the fuel concentration in the scavenge manifold may be mapped in a similar fashion to the other sources of scavenged fuel without loss of generality.

A map (e.g., relationship) between the scavenge manifold mass fractions of the scavenge manifold gas portions and intake valve to scavenge valve overlap (e.g., amount of valve opening overlap between the intake valves and scavenge valve) may be determined via engine mapping across a range of cam timings which result in various amounts of valve overlap between the intake valves and scavenge valve (e.g., from a minimum amount of possible overlap to a maximum amount of possible overlap, based on the cam timing setups). For example, for varying intake and exhaust cam timings, the relative fractions of each of the scavenge manifold gas portions may be determined using engine mapping utilizing mass fraction balance relationships.

An example map of the relationship between the scavenge manifold mass fractions and the intake valve to scavenge valve overlap is shown in FIG. 5. Specifically, FIG. 5 shows a map 500 with scavenge manifold mass fractions on the y-axis (from 0 to 1) and intake valve to scavenge valve overlap (e.g., amount of positive valve overlap between the intake valves and scavenge valve) on the x-axis (from a minimum amount of opening overlap to a maximum amount of opening overlap). The scavenge manifold mass fractions are of the scavenge manifold gas portions which include intake gases 502, pushback gases 504, and combustion products 506. For each amount of intake valve to scavenge valve overlap, the sum of all the scavenge manifold mass fractions of each of the scavenge manifold gas portions equal one (e.g., 100%). As explained above, the range of intake valve to scavenge valve overlap shown on the x-axis of map 500 includes a range from a minimal amount of opening overlap to a maximal amount of opening overlap. Example valve timing diagrams for the extreme amounts (e.g., minimal and maximal) of valve overlap are shown in FIGS. 6A-6B. In each of FIGS. 6A-6B, which are similar to valve diagrams 450 shown in FIGS. 4A-4D, engine position is shown along the horizontal axis (in crank angle degrees after TDC of the intake stroke) and valve lift is shown along the vertical axis (in millimeters). An example valve timing, lift, and duration for a set of intake valves is shown in plot 404 (e.g., intake valves 2 and 4 introduced in FIG. 1), an example valve timing, lift, and duration for a first, blowdown exhaust valve is shown in plot 408 (e.g., blowdown exhaust valve 8 introduced in FIG. 1), and an example valve timing, lift, and duration for a second, scavenge exhaust valve (e.g., scavenge valve) is shown in plot 410 (e.g., scavenge exhaust valve 6 introduced in FIG. 1). In FIG. 6A, the exhaust cam is retarded, causing the scavenge valve timing to be more retarded, and resulting in less valve overlap between the scavenge valve and intake valves (valve overlap area shown at 602). In FIG. 6B, the exhaust cam is advanced, causing the scavenge valve timing to be more advanced, and resulting in more valve overlap between the scavenge valve and intake valves (valve overlap area shown at 604).

Returning to FIG. 5, as seen in map 500, at a relatively low amount of intake valve to scavenge valve overlap (the far left bar of map 500), the majority of the scavenge manifold gases are comprised of combustion products, with a small amount of intake gases. This is due to the intake valves only being open for a relatively smaller amount of time before the scavenge valve closes. As the amount of intake valve to scavenge valve overlap increases, the relative fraction of combustion products decreases, while the relative fraction of intake gases increases. The pushback gas fraction is slightly higher at the smaller valve overlaps, but does not change as drastically as overlap amount changes (as compared to the intake gases and combustion products).

Returning to 712 of FIG. 7, a map of scavenge manifold mass fractions of scavenge manifold gas portions vs. the amount of intake valve to scavenge valve overlap, such as the map shown in FIG. 5, may be stored in the memory of the controller as a map, look-up table, or mathematical relationship. Then, based on the set intake and exhaust cam timings (e.g., intake valve and scavenge valve timings), the amount of valve overlap may be determined and input into the stored map, look-up table, or relationship. The controller may then receive the output of the scavenge manifold mass fractions for each of the scavenge manifold gas portions.

The method continues to 714 to determine the final burnt gas, fuel, and air (e.g., fresh air) concentrations in the recirculated scavenge EGR flow based on the determined mass fractions and assumed fractions of constituents in each scavenge manifold gas portion. As explained above, with reference to FIGS. 4A-4D, the combustion products may be comprised of burnt gases, burnt gases and air, and burnt gases and unburned hydrocarbons, the pushback gases may be comprised of air, burnt gases, and fuel, and the intake gases (e.g., intake manifold gases) may be comprised of fresh air, recirculated burnt gases, and recirculated (unburnt) fuel. In one embodiment, the fractions of fuel, burnt gases, and air in the pushback gases may be known for one or more of the scavenge manifold gas portions and determined according to a measured or target air-fuel ratio for combustion. If the composition of the pushback gases can not be measured during a mapping exercise, then it will be necessary to make assumptions regarding its composition based on operating condition. As for the fractions of the constituents in each of the intake gases and combustion products, these may be measured during a mapping exercise and included in the engine strategy via mapping. Then, based on the determined mass fraction for each of the scavenge manifold gas portion (e.g., pushback, combustion products, and intake gases) and the assumed or determined fractions of constituents (e.g., burnt gas, fuel, and air) within each of the scavenge manifold portions, the final concentrations of burnt gas, fuel and air in the recirculated scavenge EGR flow may be determined.

At 716, the method includes determining the total flow of burnt gas, fuel, and air to the intake passage (upstream of the compressor) via the scavenge EGR passage based on the determined final burnt gas, fuel, and air concentrations and the determined total bulk flow through the scavenge EGR passage. For example, by multiplying the concentration of each of the final burnt gas, fuel, and air concentrations by the total bulk flow (determined at 708), the total flows of each of burnt gas, fuel, and air recirculated to the intake passage via the scavenge EGR passage may be determined. In this way, the method at 716 may determine the relative amounts of burnt gases, fresh air, and unburned hydrocarbons flowing to the intake passage, upstream of the compressor, via the scavenge manifold and scavenge EGR passage system.

Continuing to 718, the method includes adjusting engine operating parameter(s) based on the determined total flows of burnt gas, fuel, and air. Adjusting the engine operating parameter(s) may include adjusting one or more of intake cam timing, exhaust cam timing (e.g., the timing of the scavenge exhaust valves), an amount of opening or position of the BTCC valve (e.g., valve 54 shown in FIG. 1), an amount of opening or position of the scavenge manifold bypass valve (e.g., valve 97 shown in FIG. 1), an amount or timing of fuel injection into engine cylinders, etc. For example, based on the determined total flows of burnt gas, fuel, and air, the controller may determine a control signal to send to one or more of the valves listed above and/or the cam systems listed above, such as a valve position or timing. As an example, the controller may determine the valve adjustment or cam timing adjustment through a determination that directly takes into account the determined total flows of burnt gas, fuel, and air. In one example, this may include increasing the amount of opening of the BTCC valve as the total flow of burnt gas decreases relative to a desired flow amount. The desired flow amount may be determined based on engine operating conditions, such as engine speed and/or load, mass air flow, etc. In other examples, the controller may determine the valve positions and/or cam timings based on a calculation using a look-up table with the inputs being the determined total flows of burnt gas, fuel, and air, and the output(s) being a valve position and/or cam timing adjustment. As another example, the controller may make a logical determination (e.g., regarding a position of one or more of the above described valves or timing of the cam system(s)) based on logic rules that are a function of the total flows of the burnt gas, fuel, and air. The controller may then generate a control signal that is sent to an actuator of the valve(s) and/or camshaft timing system(s). As one example, the controller may adjust a position of the BTCC valve and/or exhaust cam timing in response to the determined total flow of burnt gases in order to achieve a desired recirculation of exhaust gases to the intake via the scavenge EGR passage. For example, if the determined total flow of burnt gases is lower than the desired recirculation of exhaust gases to the intake, the controller may actuate the BTCC valve to open (or increase a frequency of modulating the opening/closing of the BTCC valve) and/or the controller may advance the exhaust cam timing. In another example, the controller may adjust a position of the BTCC valve, exhaust cam timing, and/or intake cam timing in response to the determined total flow of fresh air in order to achieve a desired blowthrough air (e.g., fresh air) flow to the intake via the scavenge EGR passage. For example, if the determined total flow of fresh air is less than the desired blowthrough air, the controller may actuate the BTCC valve to open, retard exhaust cam timing, and/or advance intake cam timing. In yet another example, the controller may adjust fuel injection timing and/or fuel injection amounts based on the determined total flow of fuel to the intake via the scavenge EGR passage. The desired flow amounts discussed above and further below (e.g., with regard to FIG. 8) may be determined based on engine operating conditions such as engine speed and load and/or mass air flow.

Figure 8:
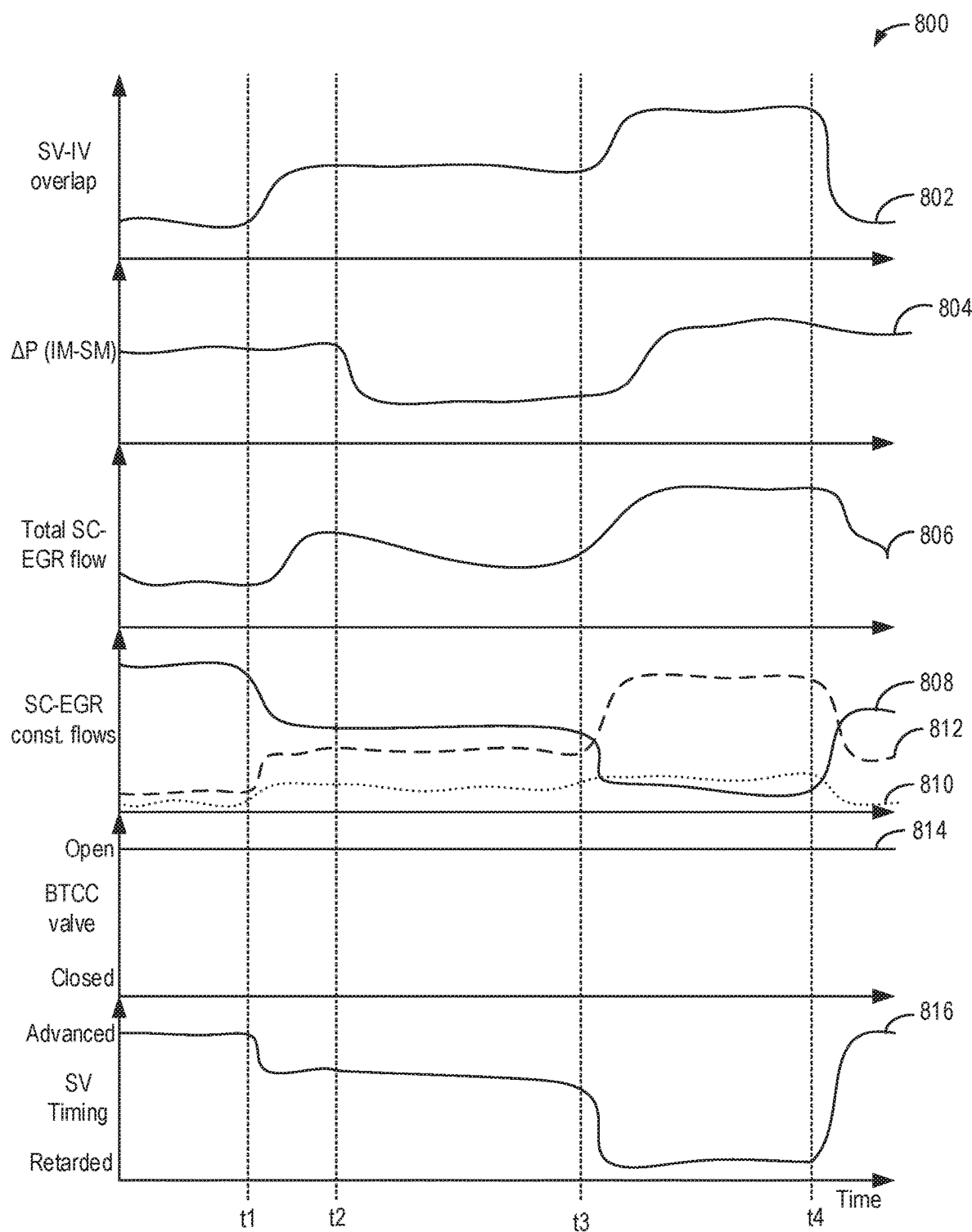
FIG. 8 shows adjustments to engine operating parameters based on changes in the determined total flows of burnt gases, fresh air, and unburned hydrocarbons through the scavenge exhaust gas recirculation passage.

Turning to FIG. 8, a graph 800 shows adjustments to engine operating parameters based on changes in the determined total flows of burnt gas, fresh air, and unburned hydrocarbons through the scavenge EGR passage. Specifically, graph 800 shows changes in valve opening overlap between the scavenge valves and intake valves (e.g., amount of valve opening overlap between the scavenge valves and intake valves, referred to below as SV-IV overlap) at plot 802, changes in pressure drop from the intake manifold to scavenge manifold (e.g., pressure drop across the "variable orifice" created by the overlap period between the intake valves and scavenge valves) at plot 804, changes in total flow (total bulk flow) through the scavenge EGR passage (e.g., total SC-EGR flow) at plot 806, changes in the SC-EGR constituent flows, including burnt gas flow at plot 808, unburned hydrocarbons flow at plot 810, and fresh air flow at plot 812, changes in a position of the BTCC valve (e.g., valve 54 arranged in the scavenge EGR passage shown in FIG. 1) at plot 814, and changes in scavenge valve timing (e.g., exhaust cam timing) at plot 816.

Before time t1, the SV-IV overlap is relatively low (plot 802) and as a result, the total SC-EGR flow is relatively low (plot 806), with a higher amount of burnt gas flow (plot 808) and lower amount of fresh air flow (plot 812). Just before time t1, the desired flow of burnt gases recirculated to the intake passage may decrease relative to the actual burnt gas flow (plot 808). In response to this condition, the controller may actuate a cam timing actuator to retard the scavenge valve timing at time t1 (plot 816). In response to retarding the scavenge valve timing at time t1, the SV-IV overlap increases, thereby increasing the total SC-EGR flow (plot 806), reducing the burnt gas flow (plot 808), and increasing the fresh air flow (plot 812).

At time t2, the pressure drop between the intake manifold and scavenge manifold decreases (plot 804), causing the total SC-EGR flow to decrease (plot 806). Before time t3, the desired flow of fresh air recirculated to the intake passage (e.g., blowthrough air) may increase relative to the actual fresh air flow (plot 812). Thus, in response, at time t3, the controller may actuate the cam timing actuator to further retard the scavenge valve timing (plot 816).

Just before time t4, the desired burnt gas flow to the intake passage may increase relative to the actual burnt gas flow (plot 808). In response to this condition, the controller may actuate the cam timing actuator to advance the scavenge valve timing (plot 816), thereby resulting in a decrease in the SV-IV overlap (plot 802), which results in a decrease in the total SC-EGR flow (plot 806), an increase in the burnt gas flow (plot 808), and a decrease in the fresh air flow (plot 812).

While adjustments in scavenge valve timing (e.g., exhaust cam timing) responsive to changes in the determined SC-EGR constituent flows are shown in FIG. 8, in alternate embodiments, the controller may additionally or alternatively adjust intake valve timing and/or a position of the BTCC valve responsive to the changes in SC-EGR constituent flows.

In this way, the total flow through a scavenge EGR passage, routed between a scavenge exhaust manifold and the intake passage, upstream of a compressor, may be determined based on valve opening overlap area between the scavenge valves and intake valves and a pressure difference between the intake manifold and scavenge manifold. This determination may be performed via pressure measurements in the intake manifold and scavenge manifold, but without use of a delta pressure measurement system (as described above). As a result, the total flow may be determined in a more efficient manner, with existing engine sensors and without limiting engine performance and high load conditions. Further, by utilizing engine mapping to determine a relationship between scavenge manifold mass fractions of the scavenge manifold gas portions (e.g., pushback gases, combustion products, and intake manifold gases) and valve overlap between the scavenge valves and intake valves, and the determined total flow through the scavenge EGR passage, final concentrations and flow values of each of burnt gases, unburned hydrocarbons, and fresh air recirculated through the scavenge EGR passage may be determined. These flow values may then be used to control the engine to deliver desired amounts of burnt gases and fresh blowthrough air to the intake passage. For example, engine operating parameter adjustments may be made in response to the determined total flows of each of the burnt gases, unburned hydrocarbons, and fresh air in order to increase engine efficiency. The technical effect of adjusting engine operation in response to a flow of gases to an intake passage, upstream of a compressor, from a scavenge manifold coupled to scavenge exhaust valves, the flow of gases determined based on a valve opening overlap between the scavenge exhaust valves and intake valves of an engine, the scavenge exhaust valves opened at a different time than blowdown exhaust valves coupled to a blowdown manifold coupled to a turbine is increasing engine efficiency while not limiting engine performance at high load conditions.

As one embodiment, a method includes adjusting engine operation in response to a flow of gases to an intake passage, upstream of a compressor, from a scavenge manifold coupled to scavenge exhaust valves, the flow of gases determined based on a valve opening overlap between the scavenge exhaust valves and intake valves of an engine, the scavenge exhaust valves opened at a different time than blowdown exhaust valves coupled to a blowdown manifold coupled to a turbine. In a first example of the method, the flow of gases is a total flow of gases from the scavenge manifold to the intake passage, upstream of the compressor, and wherein the total flow of gases is determined based on a valve opening overlap area between the scavenge exhaust valves and intake valves, the valve opening overlap area based on a valve lift of the intake valves and a valve lift of the scavenge exhaust valves at a current crank angle. A second example of the method optionally includes the first example and further includes, wherein the total flow of gases if further determined based on a pressure of an intake manifold and a pressure of the scavenge manifold, where the pressures in the intake manifold and scavenge manifold are measured and crank angle aligned to correspond to the current crank angle for determining the valve opening overlap area. A third example of the method optionally includes one or more of the first and second examples and further includes, wherein the determined flow of gases increases as the valve opening overlap area increases and increases as a difference between the pressure in the intake manifold and the pressure in the scavenge manifold increases, and further comprising adjusting an engine actuator to increase the flow of gases from the scavenge manifold to the intake passage, upstream of the compressor, in response to the determined flow of gases being less than a desired flow of gases. A fourth example of the method optionally includes one or more of the first through third examples and further includes, wherein the flow of gases to the intake passage from the scavenge manifold includes individual flows of each of burnt gases, unburned hydrocarbons, and fresh air, and wherein the valve opening overlap is an amount of valve opening overlap between the scavenge exhaust valves and the intake valves. A fifth example of the method optionally includes one or more of the first through fourth examples and further includes, wherein adjusting engine operation includes adjusting one or more of a position of a valve disposed in a passage coupled between the scavenge manifold and the intake passage, upstream of the compressor, a timing of the scavenge exhaust valves, and a timing of the intake valves. A sixth example of the method optionally includes one or more of the first through fifth examples and further includes, wherein adjusting engine operation includes adjusting an engine actuator in response to the determined flow of gases and based on a desired flow of combusted gases and a desired flow of fresh blowthrough air to the intake passage, upstream of the compressor, from the scavenge manifold. A seventh example of the method optionally includes one or more of the first through sixth examples and further includes determining a concentration of each of burnt gases, unburned hydrocarbons, and fresh air in the determined flow of gases based on an amount of valve opening overlap between the scavenge valves and intake valves and further comprising adjusting an engine operating parameter based on the determined flow of gases and the determined concentration of each of burnt gases, unburned hydrocarbons, and fresh air. An eighth example of the method optionally includes one or more of the first through seventh examples and further includes, wherein adjusting the engine operating parameter includes adjusting one or more of a fuel injection timing or amount, a position of a valve arranged in a passage between the scavenge manifold and the intake passage, upstream of the compressor, a position of a valve arranged in a bypass passage coupled between the scavenge manifold and an exhaust passage, downstream of the turbine, an exhaust cam timing, and an intake cam timing.

As another embodiment, a method includes adjusting an engine operating parameter based on a total flow of gases to an intake passage, upstream of a compressor, from a scavenge manifold coupled to scavenge exhaust valves, the total flow of gases determined based on a valve opening overlap area between the scavenge exhaust valves and intake valves of an engine and pressures in each of an intake manifold and the scavenge manifold, the scavenge exhaust valves opened at a different time than blowdown exhaust valves coupled to a blowdown manifold coupled to a turbine. In a first example of the method, the valve opening overlap area is determined based on a valve lift of the scavenge exhaust valves and a valve lift of the intake valves at a current crank angle. A second example of the method optionally includes the first example and further includes, wherein the pressures in each of the intake manifold and the scavenge manifold are measured at the current crank angle. A third example of the method optionally includes one or more of the first and second examples and further includes, adjusting the measured pressure of the scavenge manifold based on engine speed. A fourth example of the method optionally includes one or more of the first through third examples and further includes, determining a concentration of burnt gas, a concentration of unburned hydrocarbons, and a concentration of fresh air within the total flow of gases based on an amount of valve opening overlap between the scavenge exhaust valves and intake valves, and wherein adjusting the engine operating parameter includes adjusting the engine operating parameter based on individual flows of each of the burnt gas, unburned hydrocarbons, and fresh air, which are based on the determine concentrations of burnt gas, unburned hydrocarbons, and fresh air, respectively, and the determined total flow of gases. A fifth example of the method optionally includes one or more of the first through fourth examples and further includes, wherein adjusting the engine operating parameter includes adjusting a timing of one or more of the scavenge exhaust valves and the intake valves. A sixth example of the method optionally includes one or more of the first through fifth examples and further includes, wherein adjusting the engine operating parameter includes adjusting a position of a valve disposed in a passage coupled between the scavenge manifold and the intake passage, upstream of the compressor. A seventh example of the method optionally includes one or more of the first through sixth examples and further includes, wherein adjusting the engine operating parameter includes adjusting a position of a valve disposed in a bypass passage coupled between the scavenge manifold and an exhaust passage, downstream of the turbine, the exhaust passage coupled to the blowdown manifold.

As yet another embodiment, a system for an engine includes a plurality of cylinders, each including an intake valve, a scavenge exhaust valve, and a blowdown exhaust valve; an intake manifold coupled to the intake valve of each cylinder; a scavenge manifold coupled to the scavenge exhaust valve of each cylinder and an intake passage, upstream of a compressor, via a scavenge exhaust gas recirculation passage; a blowdown manifold coupled to the blowdown exhaust valve of each cylinder and an exhaust passage including a turbine; and a controller with computer readable instructions stored on non-transitory memory that when executed during engine operation, cause the controller to: determine a total flow of gases through the scavenge exhaust gas recirculation passage, from the scavenge manifold to the intake manifold, upstream of the compressor, based on a valve opening overlap area between the scavenge exhaust valve and intake valve; and adjust an operating parameter of the engine based on the determined total flow of gases. In a first example of the system, the total flow of gases is further determined based on a measured pressure in the intake manifold and a measured pressure in the scavenge manifold. A second example of the system optionally includes the first example and further includes, wherein the valve opening overlap area is determined based on a valve lift of the scavenge valve and a valve lift of the intake valve at a current crank angle, and wherein the operating parameter that is adjusted includes one or more of a timing of the scavenge valve, a timing of the intake valve, and a position of a valve disposed in the scavenge exhaust gas recirculation passage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting engine operation in response to a flow of gases to an intake passage, upstream of a compressor, from a scavenge manifold coupled to scavenge exhaust valves, the flow of gases determined with instructions executed by a processor based on a valve opening overlap between the scavenge exhaust valves and intake valves of an engine and pressures in each of an intake manifold and the scavenge manifold, the scavenge exhaust valves opened at a different time than blowdown exhaust valves coupled to a blowdown manifold coupled to a turbine.

2. The method of claim 1, wherein the flow of gases is a total flow of gases from the scavenge manifold to the intake passage, upstream of the compressor, and wherein the total flow of gases is determined with the instructions executed by the processor based on a valve opening overlap area between the scavenge exhaust valves and the intake valves, the valve opening overlap area based on a valve lift of the intake valves and a valve lift of the scavenge exhaust valves at a current crank angle.

3. The method of claim 2, wherein the total flow of gases is further determined with the instructions executed by the processor based on the pressure of the intake manifold and the pressure of the scavenge manifold, where the pressures in the intake manifold and the scavenge manifold are measured and crank angle aligned to correspond to the current crank angle for determining the valve opening overlap area.

4. The method of claim 3, wherein the determined flow of gases increases as the valve opening overlap area increases and increases as a difference between the pressure in the intake manifold and the pressure in the scavenge manifold increases, and further comprising adjusting an engine actuator to increase the flow of gases from the scavenge manifold to the intake passage, upstream of the compressor, in response to the determined flow of gases being less than a desired flow of gases.

5. The method of claim 1, wherein the flow of gases to the intake passage from the scavenge manifold includes individual flows of each of burnt gases, unburned hydrocarbons, and fresh air, and wherein the valve opening overlap is an amount of valve opening overlap between the scavenge exhaust valves and the intake valves.

6. The method of claim 1, wherein adjusting the engine operation includes adjusting one or more of a position of a valve disposed in a passage coupled between the scavenge manifold and the intake passage, upstream of the compressor, a timing of the scavenge exhaust valves, and a timing of the intake valves.

7. The method of claim 1, wherein adjusting the engine operation includes adjusting an engine actuator in response to the determined flow of gases and based on a desired flow of combusted gases and a desired flow of fresh blowthrough air to the intake passage, upstream of the compressor, from the scavenge manifold.

8. The method of claim 1, further comprising determining, with the instructions executed by the processor, a concentration of each of burnt gases, unburned hydrocarbons, and fresh air in the determined flow of gases based on an amount of valve opening overlap between the scavenge valves and the intake valves and further comprising adjusting an engine operating parameter based on the determined flow of gases and the determined concentration of each of burnt gases, unburned hydrocarbons, and fresh air.

9. The method of claim 8, wherein adjusting the engine operating parameter includes adjusting one or more of a fuel injection timing or amount, a position of a valve arranged in a passage between the scavenge manifold and the intake passage, upstream of the compressor, a position of a valve arranged in a bypass passage coupled between the scavenge manifold and an exhaust passage, downstream of the turbine, an exhaust cam timing, and an intake cam timing.

10. A method, comprising:
adjusting an engine operating parameter based on a total flow of gases to an intake passage, upstream of a compressor, from a scavenge manifold coupled to scavenge exhaust valves, the total flow of gases determined with instructions executed by a processor based on a valve opening overlap area between the scavenge exhaust valves and intake valves of an engine and pressures in each of an intake manifold and the scavenge manifold, the scavenge exhaust valves opened at a different time than blowdown exhaust valves coupled to a blowdown manifold coupled to a turbine.

11. The method of claim 10, wherein the valve opening overlap area is determined with the instructions executed by the processor based on a valve lift of the scavenge exhaust valves and a valve lift of the intake valves at a current crank angle.

12. The method of claim 11, wherein the pressures in each of the intake manifold and the scavenge manifold are measured at the current crank angle.

13. The method of claim 12, further comprising adjusting the measured pressure of the scavenge manifold based on engine speed.

14. The method of claim 10, further comprising determining, with the instructions executed by the processor, a concentration of burnt gas, a concentration of unburned hydrocarbons, and a concentration of fresh air within the total flow of gases based on an amount of valve opening overlap between the scavenge exhaust valves and the intake valves, and wherein adjusting the engine operating parameter includes adjusting the engine operating parameter based on individual flows of each of the burnt gas, unburned hydrocarbons, and fresh air, which are based on the determined concentrations of burnt gas, unburned hydrocarbons, and fresh air, respectively, and the determined total flow of gases.

15. The method of claim 10, wherein adjusting the engine operating parameter includes adjusting a timing of one or more of the scavenge exhaust valves and the intake valves.

16. The method of claim 10, wherein adjusting the engine operating parameter includes adjusting a position of a valve disposed in a passage coupled between the scavenge manifold and the intake passage, upstream of the compressor.

17. The method of claim 10, wherein adjusting the engine operating parameter includes adjusting a position of a valve disposed in a bypass passage coupled between the scavenge manifold and an exhaust passage, downstream of the turbine, the exhaust passage coupled to the blowdown manifold.

18. A system for an engine, comprising:
a plurality of cylinders, each including an intake valve, a scavenge exhaust valve, and a blowdown exhaust valve;
an intake manifold coupled to the intake valve of each cylinder;
a scavenge manifold coupled to the scavenge exhaust valve of each cylinder and an intake passage, upstream of a compressor, via a scavenge exhaust gas recirculation passage;
a blowdown manifold coupled to the blowdown exhaust valve of each cylinder and an exhaust passage including a turbine; and
a controller with computer readable instructions stored on non-transitory memory that when executed during engine operation, cause the controller to:
determine a total flow of gases through the scavenge exhaust gas recirculation passage, from the scavenge manifold to the intake manifold, upstream of the compressor, based on a valve opening overlap area between the scavenge exhaust valve and the intake valve and pressures in each of the intake manifold and the scavenge manifold; and
adjust an operating parameter of the engine based on the determined total flow of gases.

19. The system of claim 18, wherein the total flow of gases is further determined based on a measured pressure in the intake manifold and a measured pressure in the scavenge manifold.

20. The system of claim 18, wherein the valve opening overlap area is determined based on a valve lift of the scavenge valve and a valve lift of the intake valve at a current crank angle, and wherein the operating parameter that is adjusted includes one or more of a timing of the scavenge valve, a timing of the intake valve, and a position of a valve disposed in the scavenge exhaust gas recirculation passage.

* * * * *